GASEOUS DISPLAY AND MEMORY APPARATUS

Filed Dec. 22, 1966 8 Sheets-Sheet 1

INVENTORS
Donald L. Bitzer
Hiram Gene Slottow
Robert H. Willson
By Merriam, Marshall, Shapiro & Klose
ATTORNEYS INVENTORS
Donald L. Bitzer
Hiram Gene Slottow
Robert H. Willson
By Merriam, Marshall, Shapiro & Klose
ATTORNEYS INVENTORS
Donald L. Bitzer
Hiram Gene Slottow
Robert H. Willson
By Merriam, Marshall, Shapiro & Klose
ATTORNEYS INVENTORS
DONALD L. BITZER
HIRAM GENE SLOTTOW
ROBERT H. WILLSON
BY Merriam, Marshall, Shapiro & Klose ATTORNEYS INVENTORS
DONALD L. BITZER
HIRAM GENE SLOTTOW
ROBERT H. WILLSON
BY Merriam, Marshall, Shapiro & Klose ATTORNEYS INVENTORS
DONALD L. BITZER
HIRAM GENE SLOTTOW
ROBERT H. WILLSON
BY Merriam, Marshall, Shapiro & Klose ATTORNEYS

GASEOUS DISPLAY AND MEMORY APPARATUS

Filed Dec. 22, 1966 8 Sheets-Sheet 7

INVENTORS
DONALD L. BITZER
HIRAM GENE SLOTTOW
ROBERT H. WILLSON
BY Merriam, Marshall, Shapiro & Klose ATTORNEYS INVENTORS
DONALD L. BITZER
HIRAM GENE SLOTTOW
ROBERT H. WILLSON
Merriam, Marshall, Shapiro & Klose ATTORNEYS 3,559,190
GASEOUS DISPLAY AND MEMORY APPARATUS Donald L. Bitzer and Hiram Gene Slottow, Urbana, Ill., and Robert H. Willson, Ellicott City, Md., assignors to University of Illinois, Urbana, Ill., a corporation of Illinois Continuation-in-part of application Ser. No. 521,357, Jan. 18, 1966. This application Dec. 22, 1966, Ser. No. 613,693
Int. Cl. G11c *11/28;* H01j *11/00*
U.S. Cl. 340—173 33 Claims

ABSTRACT OF THE DISCLOSURE

A plasma display apparatus for information storage and display having a bistable gaseous discharge cell with memory characteristics arising from charge storage on the cell walls. A panel array of bistable gaseous discharge cells with information transfer to and from the array being effected by electrical discharge signals selectively coupled externally of the gaseous discharge medium for controlling cell wall charges associated with the information stored in selected cells. Display apparatus having bistable gaseous discharge cells responding directly to digital information from a computer.

This is a continuation-in-part of application Ser. No. 521,357 filed Jan. 18, 1966 now abandoned.

This invention relates to gaseous display and memory apparatus and in particular to apparatus utilizing a pulsing type gaseous discharge cell having bistable characteristics.

In accordance with the principles of the present invention, a pulsing discharge "minicell" is provided in which a suitable gas is placed intermediate and electrically insulated from a pair of conductors external to the gas cell. By coupling appropriate drive signals to the external conductors, the gaseous medium is discharged and the discharge is rapidly extinguished almost as soon as it is initiated. The term "minicell" is herein sometimes used to denote a gaseous discharge cell adapted for panel array and which operates in this pulsing manner. As will be described in more detail, the pulsing operation occurs due to the rapid formation of wall charges in the cell which counteract the applied signal to such an extent that the discharge is quickly extinguished.

In such a cell having suitable wall charges formed therein by the first discharge, the applied signal necessary to establish succeeding discharges can have a significantly lower magnitude than that required to discharge the cell in the absence of wall charges. There is thus provided a bistable device in the voltage region between these two levels wherein memory resides, in effect, in the wall charges.

The present invention is primarily concerned with utilization of the wall charge conditions as mentioned above to impart information in display and memory systems as will be more particularly described hereinafter. This invention is believed to constitute the first use of a pulsing type gaseous discharge cell in which wall charges are manipulated or controlled for imparting information in information systems. Thus, while there will be described herein specific embodiments, structures, techniques and conditions for enabling one to practice these invention or inventions, it must be understood that it is within the scope of the invention to provide alternative embodiments, structures, etc. obvious to one skilled in the art after acquiring the teachings herein.

A particularly useful application of the minicell described above is in a plasma display unit wherein a plurality of such minicells can be incorporated in a compact panel array and appropriately operated to display desired subject matter. Using an array of minicells provides a much higher display resolution than any known gaseous display panel configuration. A compact display unit, such as a panel type, is very desirable for use with computer controlled teaching systems as disclosed in copending application entitled "Versatile Display Teaching System," Donald Bitzer, Ser. No. 502,877, filed Oct. 23, 1964. In rather large teaching systems such as shown in the above mentioned copending application, the disclosed cathode ray tube and storage tube display arrangement and the associated digital to analog conversion equipment becomes very complex and costly. Due to the bistable characteristics of the gas cell of this invention, an array of such cells can respond directly to the digital signals from the computer.

Previous attempts at forming gaseous discharge displays have utilized a number of relatively large cells each of which contains internal conductors placed within the cell, an illustrative example of one of these cells being the commonly known neon bulb. Either an alternating or a steady D.C. signal of sufficient firing potential is applied to the internal electrodes and a glow discharge is initiated and maintained for almost the entire time during which the signal is applied. In the case of an applied alternating signal, the glow is maintained for almost the whole signal cycle. Such an arrangement is perfectly satisfactory for operating individual cells. However, when it is desirable to arrange such cells in a panel type array containing a great number of cells, it is required that rather elaborate isolating means be employed between each of the cells to eliminate feed-back problems and the erroneous and ambiguous firing of undesired cells. In contrast, according to one aspect of the present invention, by placing the conductors external to the gas cells, inherent isolation between an individual cell and any other of the cells as used in a display panel array is provided by the effective capacitive reactance in series with each cell and the conductors.

Some attempts have been made in the past to construct display and memory devices having a gas filled tube with external conductors. These prior devices provide a discharge by applying a very high frequency signal, usually in the multi-megacycle frequency range, to the electrodes, producing a rapidly varying field coupled internally to the gaseous medium in the tube. The rapidly varying field causes the gas to ionize and the resulting discharge is present for the entire or substantially all of the applied signal cycle. For convenience we may term this type of discharge operation as type I.

It is a characteristic of type I discharges that there is no significant charging of the tube walls, since among other conditions, the frequency of the applied signal is sufficiently high to prevent the walls from assuming a net charged condition. As an illustrative example, if the applied signal frequency is extremely high, a condition exists where the polarity of the signal reverses so quickly that most of the charged particles remain in the valume between the walls and do not reach the walls.

In all known attempts at prior art display and memory devices using a gaseous medium with either internal or external electrodes, the discharge and the resulting glow are maintained throughout the entire or substantially all of the applied signal cycle. Furthermore, it is to be particularly noted that all known attempts at forming prior art gaseous discharge display and memory apparatus have utilized the memory associated with charges in the gas volume itself as apposed to the present invention wherein the memory is associated with charges on the cell walls as will be described.

Another type of gaseous discharge operation can be obtained, and for convenience we may refer to it as type II. With a type II operation, a cell condition can be provided such that wall charges are formed on the inner cell walls. Such a condition can be obtained by reducing the dimensions of the cell or by reducing the frequency of the applied signal. Since oppositely charged particles are attracted to respective cell walls, the voltage resulting from the wall charge condition is such as to oppose the applied signal.

In certain circumstances in a type II operation, the charge builds up on the walls very rapidly, so that the discharge is extinguished almost as soon as, or shortly after, it starts. This produces a pulsing type discharge. The rapid establishment of the wall charges during a discharge, the resulting pulse type discharge, and the use of these conditions to impart information is the primary concern of the present invention.

In these pulse-type discharge situations, the time of discharge is only a very small portion of the applied signal cycle. For certain applied signal frequencies, the discharge is extinguished in less than 0.1 microsecond (100 nanoseconds) after initiation due to the opposing potential set up by the rapidly formed wall charge. In a typical case in this region, the charged wall condition occurs so rapidly that the discharge is extinguished between 10 to 50 nanoseconds after initiation. However, whatever the frequency of the applied signal may be, it is a characteristic of the pulse-type discharge as herein described that the memory is associated with charges on the cell walls and the actual discharge time of the gaseous medium occupies only a minute fraction of the applied signal cycle.

The memory residing in the charges on the cell walls enables the ignition of a cell with wall charges with a sustaining signal which is of less magnitude than the signal originally required to ignite a cell without wall charges. Thus, once the cell has wall charges rapidly set up by the above manner, the cell can be reignited by lower magnitude sustaining signals which, in effect, maintain the wall charge memory condition in cells previously ignited, but do not affect those cells having little or insignificant wall charges. Turning the cell "off" can be accomplished by removing or reducing the wall charges below a specified level. It is this memory characteristic which enables the cell to be utilized in information systems. A cell having wall charges of the type to be herein described can be thought of as being in a different state than one without wall charges. This bistable cell condition can be utilized to indicate information in both display and memory systems.

It is believed that the rapid build-up of the wall charge constituting the basis of pulse discharge operation and the memory condition depends on several factors. Among these are the type of gas utilized, the rate at which the discharge is developed, and the pressure level. The pulse discharge phenomena has been observed by others during, for instance, the investigation of the breakdown of electrical insulators when subjected to the application of low frequency (60 c.p.s.) high voltage signals. One investigator noticed pulses in the 60 c.p.s. supply current applied in connection with glass cells having external electrodes 1.8 cm. (0.71 inch) apart with a 1.2 cm. (0.47 inch) spacing between the inner cell walls and filled with argon at pressures of 7–35 torr (mm. of mercury). Another investigator of ionization phenomenon in gases also noticed current pulses in connection with internal cell lengths of 1 cm. (0.39 inch) and 2.2 cm. (0.87 inch) filled with neon at pressures of 3.4–216 torr, and with applied signals less than 10 kc. However, it is believed the present invention constitutes the first adaptation of rapidly formed wall charges resulting in pulse type gaseous discharges to impart information in display or memory apparatus.

According to another aspect of this invention, a combined switching network and an array of pulsing discharge minicells provides display and memory apparatus operable directly from digit coded information without the need of digital to analog conversion. This extremely simplifies prior art display arrangements which require digital to analog conversion equipment when it is desired to address the display panel using digital signals as ordinarily obtained from digital computers. The combined switching network and panel array to be hereinafter described can be addressed directly by such digital signals from a computer.

The invention will be better understood from the following detailed description thereof taken in conjunction with the accompanying drawings in which.

Figure 19:
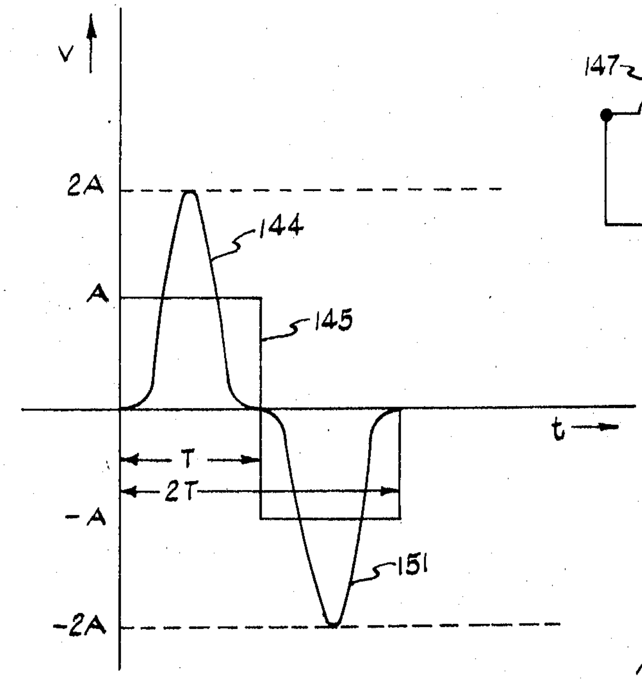
FIG. 19 is a schematic illustration of an alternative technique which can be utilized for providing an interrupted sinusodial sustaining signal.
Figure 19A:
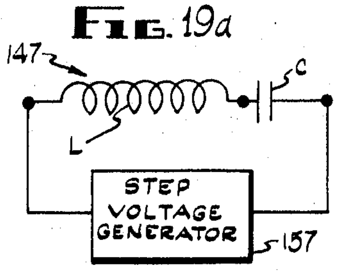
Figures 20, 21, 22, 23:
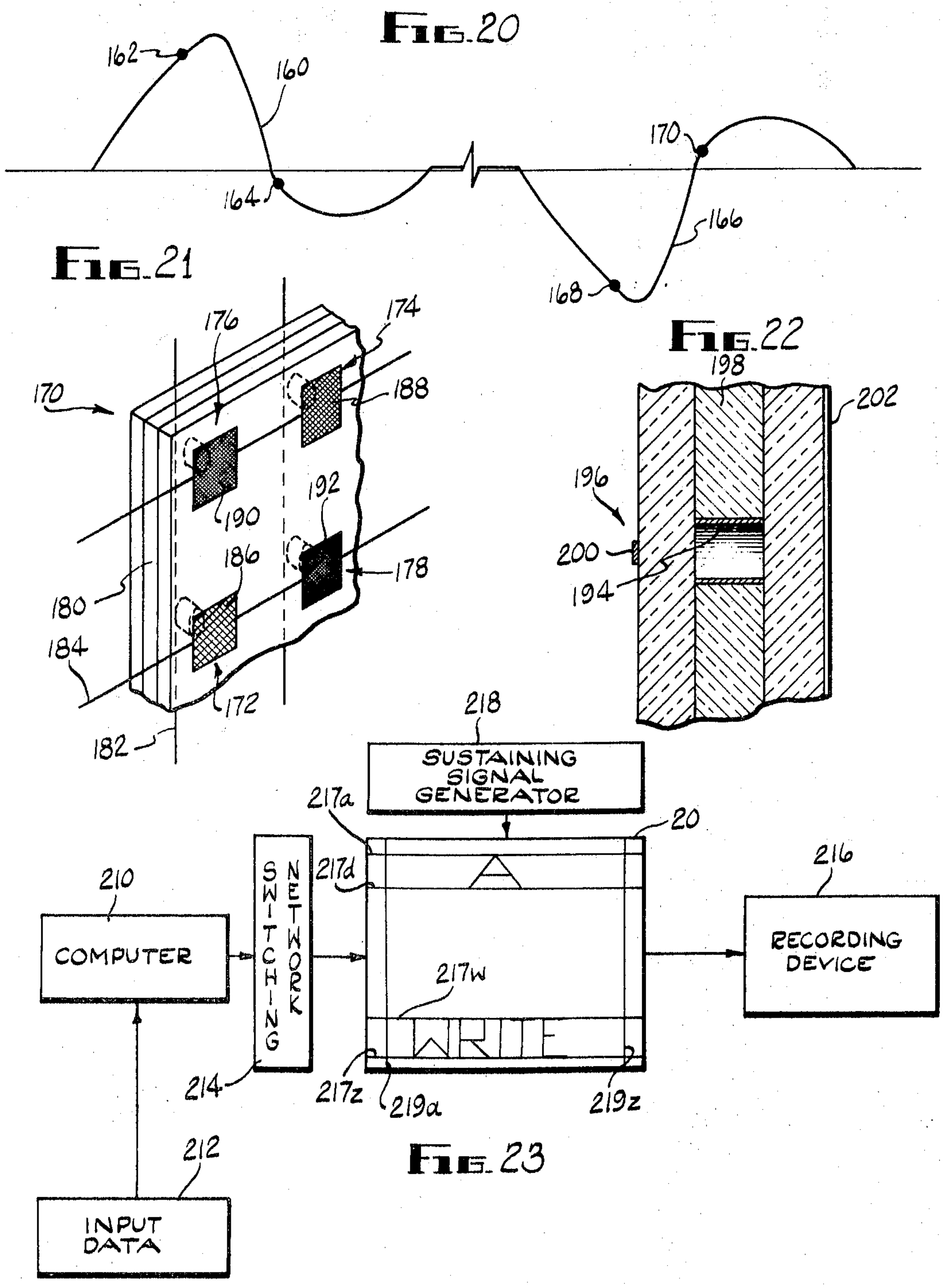
Figure 24:
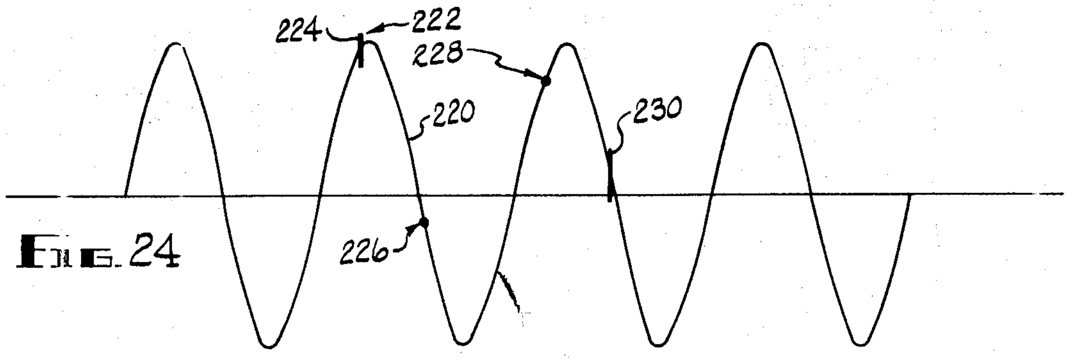
Figure 25:
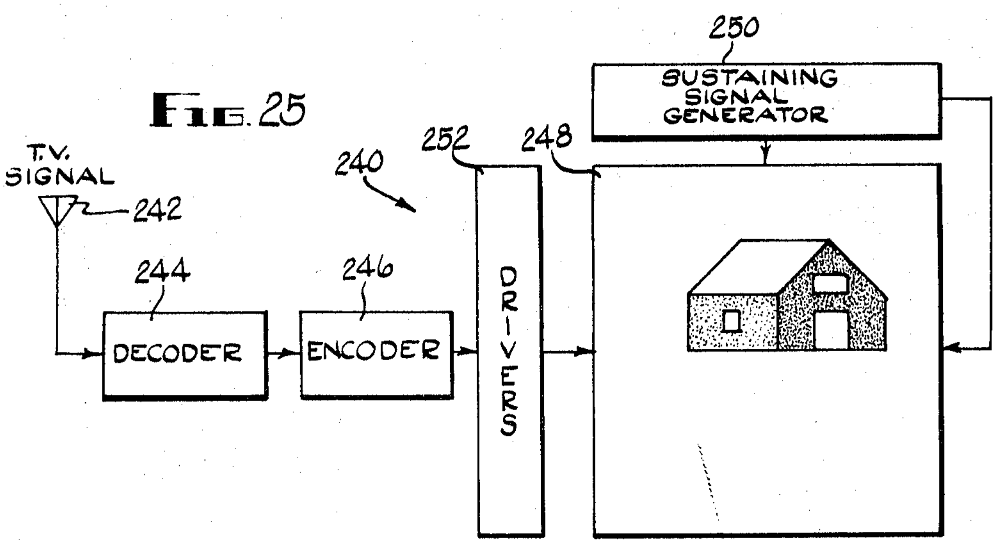
Figures 26, 27:
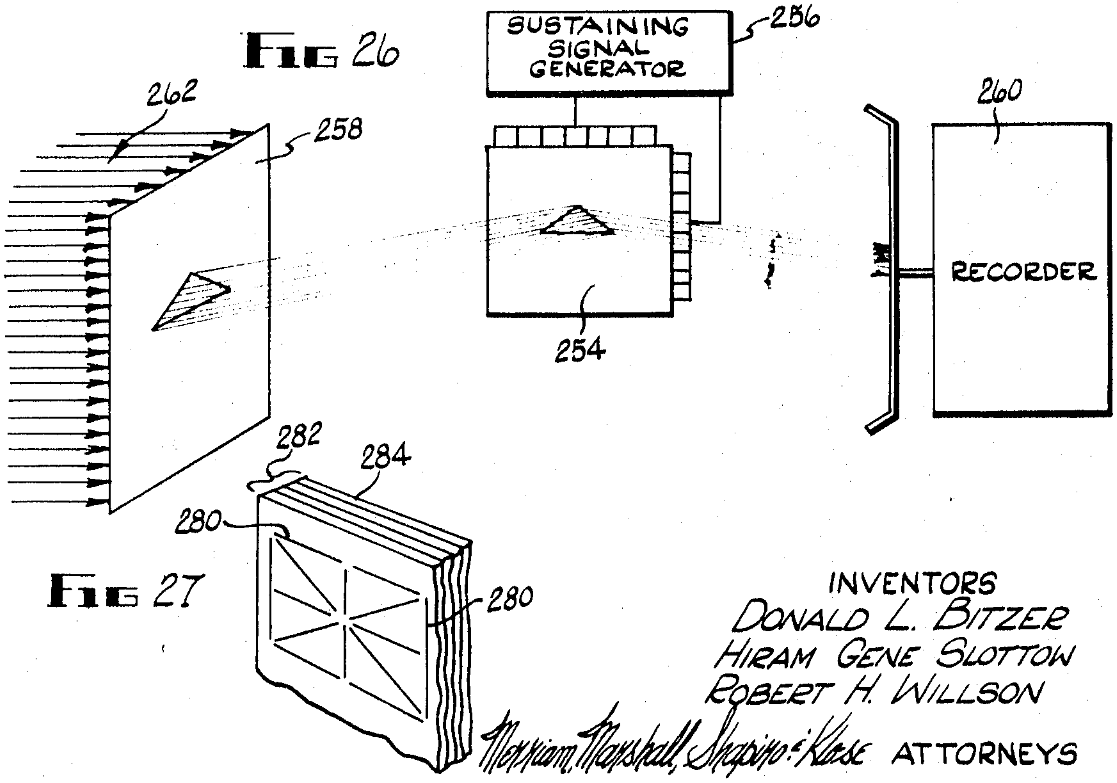

FIG. 19*a* is a schematic illustration of a series resonant capacitance—inductance circuit utilized for providing the interrupted sinusodial singal of FIG. 19;

FIG. 20 is a schematic illustration of alternative drive signals which can be applied to the gaseous cells to form two stable "on" states;

FIG. 21 is a fragmentary perspective view illustrating apparatus for deriving a contrast in brightness between various cells, which is commonly known in the art as gray scale;

FIG. 22 is a sectional view illustrating another form of the present invention wherein a phosphor coating is applied to the cell thus enabling a multi-color display to be obtained from a plurality of such cells;

FIG. 23 is a schematic block diagram of a high-speed printer utilizing an array of cells constructed according to the principles of the present invention, and wherein information is fed into the array in a line by line manner;

FIG. 24 is a schematic illustration of a sustaining signal upon which there has been impressed a light pulse at opportune periods of time so as to select the turn-on or turn-off of a desired cell;

FIG. 25 is a schematic block diagram illustrating the application of a panel array according to the present invention as a display panel in a television receiver;

FIG. 26 is a schematic block diagram illustrating the application of the cell array in a copier for transferring information from an original document to a recorder; and FIG. 27 is a perspective view of a fragment of an alternate display panel which is especially adaptable for use as a small display of alphabetical and numerical characters.

Figures 1, 2, 10:
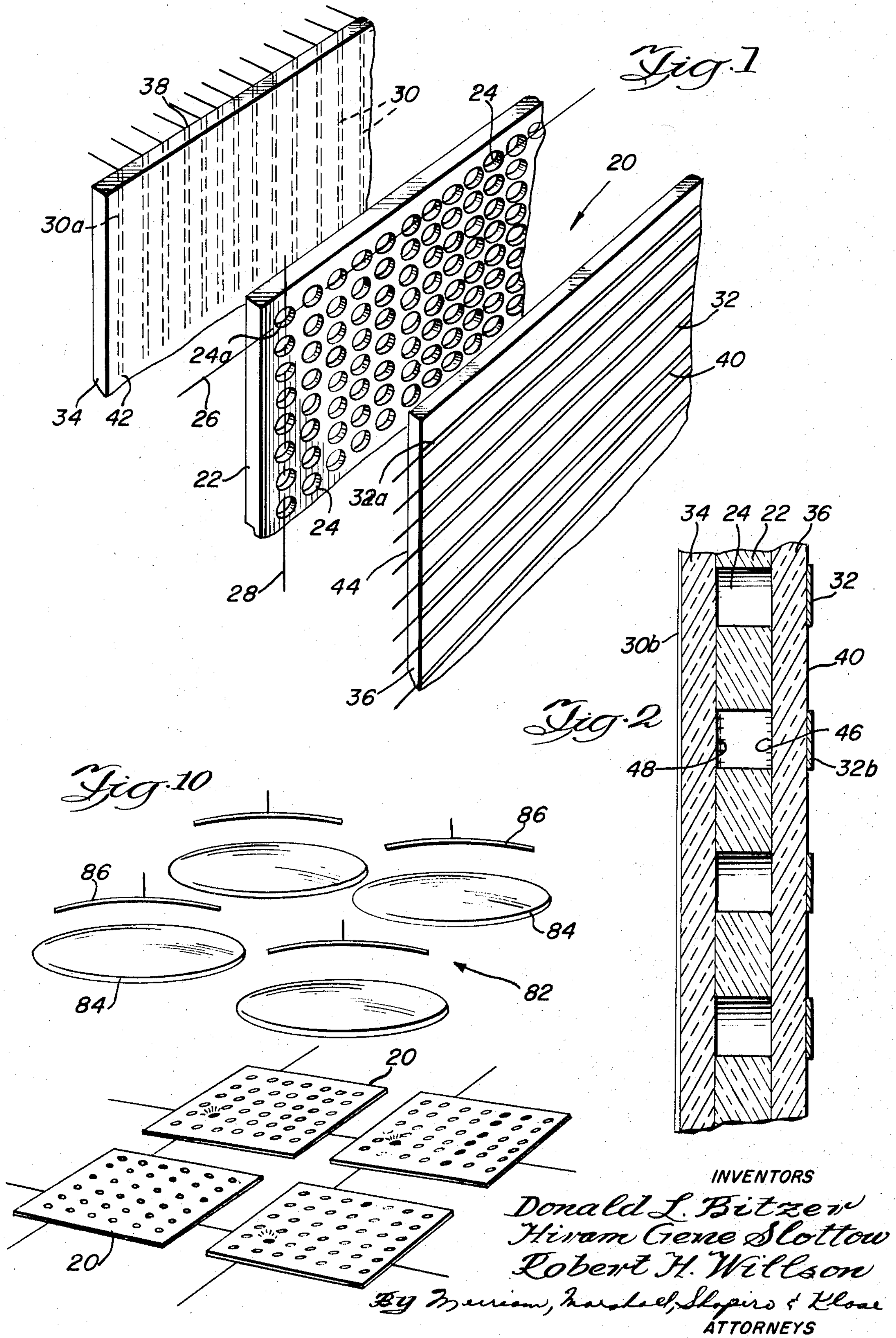
FIG. 1 is an exploded view illustrating the construction of a panel array utilizing a number of gaseous pulsing discharge minicells according to the principles of the present invention.
FIG. 2 is a composite enlarged sectional view illustrating the construction of the pulsing discharge minicell according to this invention.
FIG. 10 illustrates in schematic form the preferred embodiment of a memory unit utilizing the pulsing discharge panel of FIG. 1 in a planar array.

Referring now to FIG. 1 there is illustrated in an exploded and cut-away view the construction of a plasma panel matrix or array 20 of a plurality of minicells. The array 20 includes an inner insulating member 22 having a number of apertures 24 arranged along mutually orthogonal references axes illustrated by a horizontal axis 26 and a vertical axis 28. Aligned with the apertures 24 is a group of mutually orthogonal conductor 30 and 32 which are secured to respective outer insulating members 34 and 36 so that the conductors are exterior to the volume defined by the apertures or cells 24 and the inner insulating member 22 when the panel is assembled as shown in FIG. 2. It is to be understood that instead of the orthogonal arrangement of external conductors 30 and 32 aligned with the apertures 24, other arrangements are possible. For instance, the paired conductors can be at oblique angles or even parallel to each other if desired. The insulating members 22, 34 and 36 can be formed of a suitable glass material. For display purposes it is preferred that either insulating members 34 and 36 or both are constructed of transparent materials.

Well known techniques such as etching can be utilized to precisely locate the apertures 24 in the insulating member 22. Furthermore, the conductors 30 and 32 can be formed by evaporating a very thin layer of gold on the outer surfaces 38 and 40 of the respective outer insulating members 34 and 36, so that for display purposes the conductors are substantially transparent in order to transmit the light emitted from the cells. In the normal operating position of the panel array 20, the outer insulating members are placed closely adjacent to and abutting the inner insulating member 22 such that the apertures or cells 24 are terminated at their ends by the inner surfaces 42 and 44 of the respective outer insulating members 34 and 36. The volume within the cells 24 as defined by the surfaces 42 and 44 contains a suitable discharge responsive gas, and well known means are utilized for sealing the gas within the unit. After assembling the panel array, the volume is first evacuated and then filled with the gaseous medium. A very small amount of leakage occurs between the cells so that during the filling operation the gas will eventually fill each cell. While the array of cells may not be completely physically isolated, since minute leakage between the cells during filling is desired, the cells must be electrically isolated from each other in order to prevent ambiguous firing of adjacent cells. If desired, the panel may in the alternative be assembled in the gaseous medium.

By applying a voltage between a pair of external conductors the particular gas cell at the intersection of the corresponding conductors is discharged. For instance, the gas cell **24*a* is directly between and at the intersection of the external conductors 30*a* and 32*a* so that when a voltage large enough to ignite a discharge is applied between these conductors which are located on opposite sides of the cell array and external to the gas itself, only the gas cell 24*a*** at the intersection of the conductors will fire.

In the composite enlarged sectional view of FIG. 2 the external relation of the conductors 30 and 32 to the gas cell defined by the apertures 24 is clearly indicated. Each minicell 45 includes a cell with nonconducting cell walls 46 and 48, a gaseous discharge medium in the cell, and a pair of respective conductors 30 and 32 conductively isolated from the cell and adapted to be connected to a source of pulsing discharge signals.

It must be realized, of course, instead of the separate insulating members, suitable construction techniques may be utilized to provide an isolated gas cell in which the control electrodes are mounted external thereto. In fact it is possible that an array of conductors can be externally placed on each side of electrically isolated but not physically isolated gas "cells," such as in an elongated tube or panel filled completely with a homogeneous gas medium, so as to form discrete wall charges on nonconductive walls adjacent selected paired conductors and the apparatus still operated according to this invention.

It is clear that as in the prior art the external voltages control the discharge cells through the two sets of orthogonal conductors or electrodes. However, the behavior of the gas cell according to the present invention is entirely different from the type of discharge associated with attempts at forming prior art display and memory devices. In the pulsing discharge minicell 45, a transfer of charge to the walls 46 and 48 of the cell as shown in FIG. 2, rapidly reduces the exciting field inside the cell and extinguishes the discharge. We have found, for example, in our initial investigations that in a 95% neon-5% nitrogen gas medium maintained at 320 mm. of mercury, within the cells 24, the discharge is extinguished within approximately 20–50 nanoseconds after it is initiated. Yet the radiated light is so intense under these circumstances that even with applied sinusoidal or pulse type control signals to the external conductors having a period of 10 microseconds (100 kc.), so that the ratio of discharge time to "off time" for the cell is less than $1/100$, the gaseous discharge provides enough light for display purposes.

Furthermore, the charges built up on the cell walls remain on the walls for a period of time thus providing a memory characteristic for each minicell and a bistable device which can be used to convey information. In the illustration of FIG. 2, it is assumed that an applied varying voltage is positive on conductor **32*b* with respect to conductor 30*b* at the time of the discharge. After the discharge potential is reached, electrons are attracted to cell wall 46 and positive ions to cell wall 48, as shown in FIG. 2. Similarly, when the discharge potential is such that the voltage on conductor 32*b* is negative with respect to 30*b* the electrons flow to wall 48 and the positive ions to cell wall 46**. To ignite a cell with wall charges, the applied voltage to the external conductors may be as small as ½ the voltage needed to fire the cell in the absence of wall charges. Therefore, if a "sustaining signal" having a magnitude of voltage between these two levels is applied to all of the cells in the array, the cells having wall charges can be maintained in this state without changing the state of cells without wall charges.

A number of minicells in a variety of sizes have been constructed, but a typical minicell can be considered as one in which the outer insulating members 34 and 36 are each 0.006 inch thick and in which the apertures or gas cells 24 are 0.010 inch in diameter and in height. An array of minicells has been constructed in which the insulating members are each 0.006 inch thick, the apertures or cells are each 0.015 inch in diameter and 0.006 inch in height, and the minicells are spaced on centers 0.025 inch apart.

Figures 3, 8:
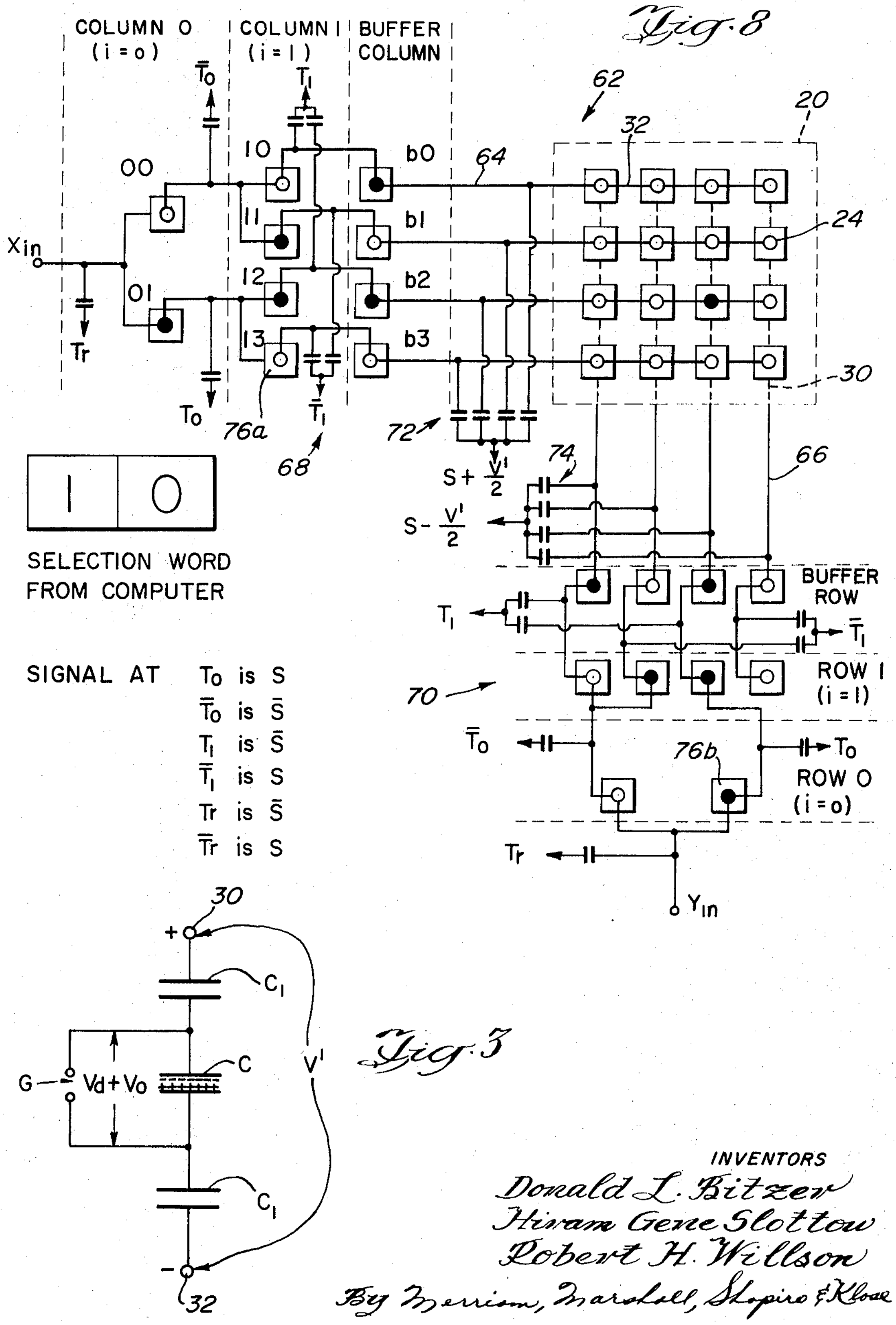
FIG. 3 is a schematic diagram illustrating an equivalent circuit for a single cell.
FIG. 8 is a schematic diagram illustrating a combined switching network and panel matrix and incorporating the preferred method for addressing the panel matrix.

Referring now to FIG. 3, there is illustrated an equivalent circuit for the single cell in which C is the capacitance across the unfired cell; $C_1$ is the capacitance between an outer electrode and the adjacent cell wall; and G is a switching mechanism which schematically represents the discharge itself. With a signal V′ between the respective outer electrodes 30 and 32, V the voltage across the unfired cell represented by the capacitor C consists of two components—a voltage $V_d$ proportional to V′, and a voltage $V_0$ proportional to the charge Q on the cell walls. This may be expressed as $$V=V_d+V_0,$$

$$V_d=\left(\frac{C_1}{C_1+2C}\right)V'$$

$${}_0=\frac{Q}{C+\frac{1}{2}C_1}$$

Whenever the gas breaks down, a quantity of charge flows to the cell walls to change the value of $V_0$. Between firings, however, the cell "remembers" the value of $V_0$.

To initiate a discharge the voltage V across the capacitor C, representative of the unfired cell, must exceed the firing voltage $V_f$. When the cell walls are substantially uncharged, the external signal must supply almost the entire voltage and since initially $V_0$ is nearly 0, $V_d$ must exceed very nearly the entire firing voltage $V_f$. Once a discharge has occurred, and the cell walls have become charged, as indicated in FIGS. 2 and 3 the external signal which is effecting $V_d$ need only supply the difference between the firing voltage $V_f$ and $V_0$ to fire the cell.

The operation of the gas cell according to the present invention can be understood more clearly by also referring to the illustrated $V_d$ signals of FIGS. 4–7 which are proportional to applied signals V′ on conductors 30 and 32. One half of the required signal can be supplied to each of the conductors 30 and 32 in a balanced manner so that the signal level across the conductors equals the required total signal. Any well known arrangement can be used. For instance, the conductors 30 and 32 can be capacitively coupled to opposite ends of a step-up transformer secondary with center tap grounded in a push-pull manner. Identical oppositely phased signals will thus be coupled to the respective conductors. The primary side of the transformer can be coupled to any well known type of circuit generating a series or train of pulses as illustrated.

As will hereinafter be described the appropriate $V_d$ signal is chosen to enable the cell to perform the desired function. Since the voltage necessary to reignite a discharge can be less than that required to initially ignite it, at an intermediate voltage the gas cell is a bistable element. Except when the state of a cell is changed the voltage $V_d$ will be within this intermediate range and is illustrated for example by the sustaining signal of FIG. 5. In the ideal "0" state the cell walls 46 and 48 are uncharged so that $V_0=0$ and the combination of $V_d$ and $V_0$ is insufficient to fire the cell. In practice it is only necessary that $V_0$ be sufficiently small such that when $V_0$ is combined with the peak $V_d$ the cell will not fire since the combination never exceeds $V_f$. In the "1" state, on the other hand, $V_0$ equals some value, due to the charge on the cell walls, within a range which might be termed a "susceptible firing range." In this range the cell is susceptible of being fired and will be fired by applying an external voltage such that $V_d$ combined with $V_0$ due to the wall charge, exceeds the required firing voltage $V_f$.

Figures 4, 5, 6, 7, 9:
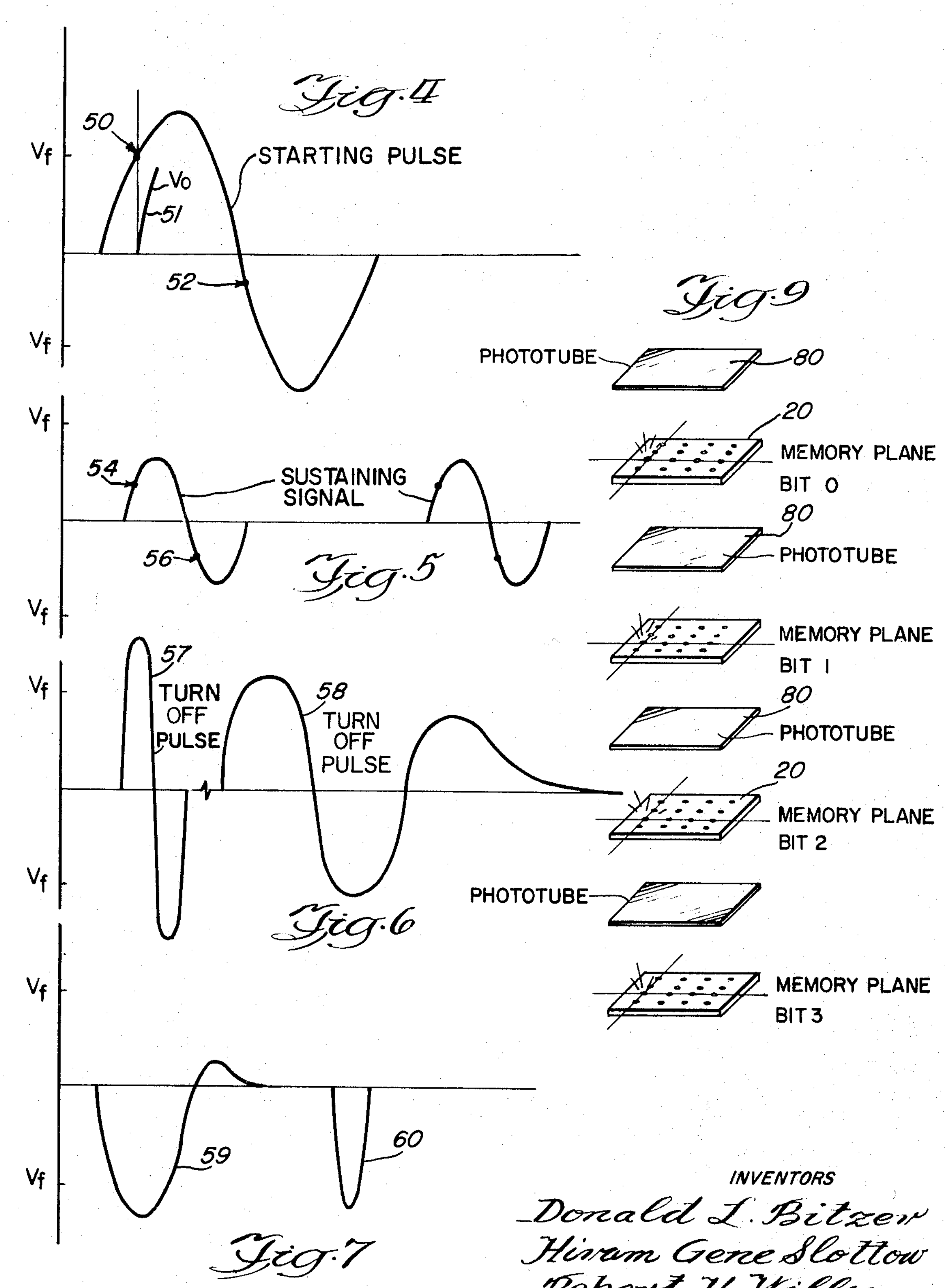
FIGS. 4–7 are schematic diagrams illustrating various signals applied to the minicell to perform desired operations thereof.
FIG. 9 is an exploded view of one embodiment incorporating the pulsing discharge panel array of minicells illustrated in FIG. 1 in a memory unit.

In FIG. 4 there is illustrated as $V_d$ one form of starting pulse which is proportional to a signal V′ applied to the external conductors 30 and 32. It must be understood that the time scale of FIG. 4 illustrating the starting pulse is different than that of FIG. 5. This starting pulse can change a cell from the "0" state to the "1" state. It may be noted that the starting pulse rises above the firing voltage indicated as $V_f$, such that the associated gas cell at the intersection point of the outer conductors will discharge. We have found, for example, that when the gas in the cell consists of a mixture of the neon and approximately 5% nitrogen that an intense discharge is produced which causes a rapid flow of charges to the walls. This intense discharge is visible and is initiated and extinguished within approximately 20–50 nanoseconds which is indicated by the reference character 50 on the starting pulse. Referring to the curve labeled 51 in FIG. 4, it can be seen that the discharge is extinguished since the magnitude of the voltage $V_0$ due to the charge build up rises rapidly until the voltage V due to the combination of $V_d$ and $V_0$ is too small to sustain the discharge. Although the discharge is extinguished very quickly, the remaining charges in the volume continue to flow to the cell walls 46 and 48. It is believed that if $V_0$ exceeds $V_d$ before all of the available charges have been transferred from the medium to the cell walls, the remaining charge particles will reverse their flow and partially counteract the desired memory charge in the cell. Thus, it is preferred that a maximum amount of charge be transferred to the cell walls so as to result in a maximum amount of memory. In some applications obtaining a maximum charge transfer may be of no significant consequence, and therefore a choice can be made as to the desired mode of operation.

In any case, on the negative excursion of the starting pulse, the cell will again discharge when the sum of the voltage proportional to the charge stored on the cell walls, combined with the voltage $V_d$, exceeds the firing voltage. It may be noted that when the applied V′ signal in FIG. 3 is reversed (on its negative excursion) the voltage $V_0$ "aids" the applied signal so that the firing voltage level $V_f$ is reached at a lower level of the applied starting pulse. Assuming for instance that the firing voltage $V_f$ is 300 volts, on the initial discharge, the amount of charge transferred to the cell walls will be such that the value of $V_0$ which is proportional to the cell wall charge will be close to but not quite 300 volts. Thus, if the transferred charge is such that the voltage $V_0=200$ volts after a first discharge, the cell will again discharge when the starting pulse is at approximately a negative 100 volts during its negative excursion as indicated at reference numeral 52 in FIG. 4. The cell fires twice, once each half cycle, but the slope of the starting pulse is greater at the time of the second discharge than it is at the first. We have found in our investigations that the amount of charged particles produced increases with the slope of the voltage $V_d$ and therefore permits the magnitude $V_0$ after the second discharge to equal and even exceed the magnitude of the wall charge at the time the second discharge occurred (100 volts in the above example).

Referring now to FIG. 5 there is illustrated one form of what might be termed "sustaining signals" (proportional to the signal applied across the outer conductors) which are utilized to discharge cells in the "1" state without changing the state of cells in the "0" state. The sustaining signal of FIG. 5 consists of a series of pulses 61 which are always coupled in a balanced manner to the external electrodes of the array. In order to provide the initial discharge and transfer a cell to the "1" state, a starting pulse corresponding to FIG. 4 is applied to the external electrodes during the gap or period of time between pulses 61 of the sustaining signal. Thereafter, all cells in the "1" or "on" state will be discharged briefly, once during each half cycle of the sustaining signal, while cells in the "0" or "off" state will remain in this state since they are not effected by the sustaining signal.

In the "0" state the charge on the cell walls is sufficiently small so that $V_0$ combined with the sustaining signal will not exceed the firing voltage $V_f$, and the cell cannot fire. Thus, no charge is transferred and the cell remains in the "0" state. In the "1" state, on the other hand, there is an amount of charge on the cell walls, such that the level of the applied sustaining signal when combined with the voltage $V_0$ proportional to the wall charge exceeds the firing voltage and the cell will fire. Whether sinusoidal or pulse type sustaining signals are used, if we assume no charge leakage, etc., $V_0$, in this case, is equal to ½ the voltage change $V_c$ produced by the transfer of charge, or in other words, $$V_0 = \tfrac{1}{2} V_c$$

After the discharge, $$V_0 = -\tfrac{1}{2} V_c$$

and on the negative excursion or half cycle of the sustaining signal the cell fires again when the applied $V_d$ sustaining signal of FIG. 5 added to the voltage due to the wall charge exceeds the firing voltage. The charge transfer this time restores $V_0$ to its previous value, and the cell remains in the "1" state.

In practice we have found that the amount of wall charge after the actual second discharge in the negative half cycle of the starting pulse is close to the corresponding amount of call charge that is produced on the negative half cycle portion of the pulse 61 when the sustaining signals are reapplied. This differential charging thus insures a rapid approach to equilibrium. For the case of the pulse type sustaining signals shown in FIG. 5 the wall charges produced on the positive half cycles may slightly exceed those produced on the negative half cycles if there is a slight amount of leakage during the interval between pulses 61. On the other hand, when the sustaining signal is sinusoidal the time intervals between firings are equal, the magnitude of the slopes at the times of firings are equal, and the magnitudes of the wall charges in equilibrium are equal.

In accordance with the above description, the cell discharges and is rapidly extinguished in a pulsing manner twice, as indicated at reference numerals 54 and 56 on the sustaining signal in FIG. 5. The pulses 61 forming the sustaining signal are repeated periodically and to obtain adequate display brightness the interval between pulses should be small. In fact when the interval goes to zero the signal becomes a sinusoid.Thus, the pulse form of sustaining signal illustrated in FIG. 5 is one wherein a series of pulses with a brief lapse of time between each pulse is applied to the outer conductors. We have found that even when the discharge extinguishes in less than approximately 20 nanoseconds after it ignites, due to the presence of the resulting wall charge, the discharge may be reignited even when the time interval between sustaining pulses is increased to 200 microseconds. As an example of a pulse type sustaining signal, we have operated the cell satisfactorily with a signal having a "one cycle" pulse width of 1 microsecond and a repetition rate of 5 kc.–10 kc. (corresponding to a time interval of 100–200 microseconds between sustaining signal pulses). During the presence of the pulses 61, the cell pulse discharges twice in a time interval of approximately 0.5 microsecond. If desired, a continuous sinusoidal type of sustaining signal can also be utilized.

It appears desirable for proper operation of the discharge cell that a suitable gas mixture is utilized such that an intense discharge is produced which causes a rapid flow of charges to the walls. In our investigations we have found that when neon alone is placed in the gas cell and excited with the sine wave shaped pulses as shown in FIGS. 4 and 5, for instance, a discharge is produced which lasts for almost the entire half cycle and that the amount of memory is very small. It is possible that neon alone can be made to function in accordance with the principles of this invention relating to the formation of wall charges and the resulting pulse type discharge, if the neon is excited under suitable conditions and with proper excitation or drive signals following the teachings herein. Furthermore, we have also investigated the use of nitrogen alone and we have found that a discharge is produced and the cell walls become charged. The discharge, however, does not produce enough light for normal display purposes. As mentioned previously, our initial investigations have shown that a mixture of five to ten percent nitrogen with neon at 320 mm. of mercury in a typical size cell 0.010 inch in diameter and height performs satisfactorily, although it is to be understood that this invention is not limited to this mixture alone, since any gas or gas mixture which produces a sufficient discharge such as to cause a rapid flow of charges to the cell walls is capable of performing according to the teachings of the present invention to impart information.

For display purposes as mentioned previously a gas mixture of neon and nitrogen may be utilized to produce the intense discharge, and this discharge is reignited by use of the pulsed sustaining signals as indicated. Thus, by initiating a discharge at suitable frequent intervals the discharge will be interpreted by a viewer as being continuously on because of the retention time of the human brain and the inability to react to such rapid changes. Also, if the repetition rate of the pulsed sustaining signals illustrated in FIG. 5 is increased, the light produced by the discharge appears to become more bright due to the increasing frequency of discharges. Similarly, a dimming effect of the light will be noticeable as the repetition rate of the sustaining signals is decreased. A somewhat similar effect can be produced by using a sinusoidal signal wherein the frequency is varied. It is thus possible to frequency modulate the light source by varying the repetition rate of the sustaining signal.

Referring now to FIG. 6, there are illustrated two pulsed signals either one of which is capable of reverting a cell from the "1" state to the "0" state. In the simplest technique, the turn off pulse 57 having a pulse width much narrower than the sustaining pulses 61 is applied to the desired external conductors during a time period between two of the sustaining pulses. Many electrons leave the volume before the turn off pulse is completed, but the less mobile ions together with some electrons which they attract now drift to the walls where they neutralize the charge to leave $V_0=0$. We have also found that the pulse 58 illustrated in FIG. 6, when applied during the period between two sustaining pulses leaves $V_0$ sufficiently small such that the following sustaining pulse is insufficient to fire the cell. $V_0$ then decays slowly to zero as the remaining charge leaks around the side walls.

As in other types of gaseous discharges, the initial discharge requires the presence of some charged particles within the cell. A reliable supply of such charged particles can be supplied in various manners such as by a radioactive coating on the cell walls, by photo-emission, by metastable bombardment, etc. As an example, a conditioning pulse having a pulse width of approximately 2 microseconds can be applied to all of the conductors every 100–200 microseconds. This pulse leaves the wall charge conditions very much as they were before the pulse, and therefore, does not change states. However, it does create metastable atoms which slowly drift to the walls and upon colliding cause the emission of electrons. An example of such a pulse is shown by the signals 59 and 60 in FIG. 7. Conditioning pulse 59 will discharge a cell in the "0" state twice and leave it in the "0" state; and will not affect cells in the "1" state since the polarity of the pulse 59 is opposite to that of the voltage due to the wall charges. Conditioning pulse 60 will fire a "0" cell only once and will leave the cell in the "0" state; cells in the "1" state are not affected by this signal.

In FIG. 8 there is illustrated a combined switching network and panel matrix 62 having a plurality of minicells 45, and in which there is provided a switching network capable of being controlled directly from the output of a digital computer to drive the array of minicells. The minicells in panel matrix 20 are similar in construction to that illustrated in FIGS. 1 and 2. The apertures or gas cells 24 are each individually located at the intersection point of a corresponding pair of mutually orthogonal conductors 30 and 32. Suitable conductors 64 and 66 are connected to the panel matrix conductors and are coupled respectively to the row or X switching network 68 and to the column or Y switching network 70. The sustaining (and conditioning pulses $V'/2$ if required) are applied through capacitors 72 and 74 to all of the conductors of the panel matrix 20, and the "on" and "off" signals are directed through digitally selected low impedance paths to the appropriate conductors. Two identical circuits drive the two sets of conductors 30 and 32 and the signals are balanced. With respect to ground, therefore, the sustaining signal on the row (or X) conductors 64 has only ½ the amplitude of the signal illustrated in FIG. 5, but it is matched by a similar out of phase signal on the column (or Y) conductors 30 so that the two combine to provide the required sustaining signal. Another pair of signals is used to control the switching networks 68 and 70 and they may be referred to by the reference characters S and $\overline{S}$.

Within the switching networks 68 and 70, a number of switching elements 76 have been provided. These switching elements are gas discharge cells constructed much like the cells of the display, however, they are filled only with a noble gas such as neon, and the electrodes are on the inside of the glass panels as they are in direct current discharges. Thus, when the cells are fired by an alternating voltage, they stay on for a large part of the half cycle. If desired, the switching elements can instead be minicells either separate from or formed as one portion of the panel 20.

In the following description a technique for establishing a conduction path in the X switching network 68 will be described. The switching elements 76*a* of the switching network 68 are arranged in columns, each column corresponding to a bit position in the computer word that selects a row in the panel matrix 20. Above and below each column is a terminal identified as $T_i$ or $\overline{T}_i$ to which the switching signals are applied. If the $i^{th}$ bit in the control word is a "1" the signal at $T_i$ is $S_i$ and the signal at $\overline{T}_i$ is $\overline{S}_i$. If on the other hand, the bit is a "0," the signal will be $\overline{S}_i$ at $T_i$ and $S_i$ at $\overline{T}_i$. One half the cells in the $i^{th}$ column are connected to $T_i$ and the other half to $\overline{T}_i$. The opposite electrodes are connected to $T_{i-1}$ and $\overline{T}_{i-1}$ in such a way that exactly ½ the cells in each column will fire. The $i^{th}$ bit and $(i-1)^{th}$ bit determine which cells they will be. One side of each cell in the left most column ($i=0$) is connected to terminal $T_r$ where it is driven by the signal $\overline{S}$.

As shown in the diagram of FIG. 8 there are two cells in the first column ($i=0$) and four cells in the next ($i=1$). In general, the column labeled $i=k$ has $2^{k+1}$ cells, thus if the array were larger, the next column ($i=2$) would have eight cells. At the right of all of the switching columns in a buffer column which keeps the S and $\overline{S}$ signals from producing a voltage across the cells. This column thus acts as a buffer between the panel matrix 20 and the corresponding switching network.

FIG. 8 illustrates the state of the switching elements in the X switching network 68 when the most significant bit ($a_0$) is a "1" and the next bit ($a_1$) is a "0." The switching elements in column 0 are controlled by the most significant bit $a_0$, and since $a_0$ equals 1 the signal at $T_0$ is therefore S and in column 0 switching element 01 fires due to the combination of an $\overline{S}$ signal at $T_r$ on one side of the switching element 01 and a signal S on the other side of this switching element at $T_0$. Since the switching element 00 in column 0 has applied signals of $\overline{S}$ on both sides thereof, the element 00 does not fire.

Since $a_1$ is a "0" the signal at $T_1$ is $\overline{S}$, and at $\overline{T}_1$ the signal is S. Therefore, in column 1 the cells 11 and 12 fire and a conduction path leads from terminal $X_{in}$ to cell $b_2$ in the buffer column. Since the signal at $T_1$ is $\overline{S}$ and the signal applied through the capacitors 72 is S, a proper firing potential is applied across the element $b_2$ in the buffer column to fire this element. The conduction path thus extends from the input terminal $X_n$ of the switching network 68 to row 2 in the panel matrix 20.

In the column or Y switching network 70 which drives the column electrodes 30, the switching is the same. The appropriate switching elements in rows 0, 1, and the buffer row of the switching network 70 are selected in a manner similar to that previously described in connection with the switching networks 68 to provide a conduction path which extends from the input terminal $Y_{in}$ of the switching network 70 to column 2 in panel matrix 20. The signals at $X_{in}$ and $Y_{in}$ thus combine so as to fire the desired cell in row 2, column 2 of the panel matrix 20.

As can be seen in FIG. 8, the sustaining signals are capacitively coupled through capacitors 72 and 74 to the grid conductors 30 and 32. Instead of the illustrated individual capacitors, a pair of conducting plates can be placed adjacent to and separated by relatively thin insulating members from each of the grid conductors 30 and 32. The sustaining signals can then be coupled to each plate since these signals are always present on all the cells in the array. The selection signals for turning "on" and "off" selected cells are coupled as previously described to the respective row and column conductor for the selected cell.

Referring now to FIG. 9, there is illustrated one form of a memory unit utilizing the panel matrix shown in FIG. 1. It has been previously noted that whenever the sustaining pulse drives the panel matrix or array, each minicell in the "1" state fires twice, and during each discharge it radiates a burst of light. The minicells in the "0" state neither discharge nor radiate. In either case, the state of the cells after application of the sustaining pulse is the same as the initial cell state. The memory in the cells actually resides in the charges which remain on the cell walls from pulse to pulse. Thus, by directing a pulse similar to the sustaining pulse to only one cell in an array there is provided a non-destructive read-out signal. The read pulse, of course, is timed to appear during the period between adjacent sustaining pulses. With the addition of suitable detecting means, the panel matrix then has the properties of a digital computer memory.

FIG. 9 illustrates diagrammatically the construction of a memory unit having a sixteen word memory in which each word contains four bits. Each memory plane is formed of an array of minicells 45 in a panel matrix 20 similar to that shown in FIG. 1, and contains all the cells that correspond to one bit position in the word. The position of the cell in plane indicates the address of the word in the memory. Each of the panels 20 has a corresponding set of mutually orthogonal conductors are previously indicated, and these have been eliminated in FIG. 9 for simplicity. It is convenient to designate each cell position in the entire array by the triple subscript *l, m, n* where for this memory all three indices run from 0 to 3. The index 1 indicates the memory plane and therefore the significance of the bit in the word. The indices *m* and *n* indicate the row and the column of the cell in its plane, and they determine the address of the word according to the relation $$r=4m+n$$

Above each of the panels 20 is a suitable device 80 for detecting light. The device 80 could be a currently available flat photo tube of special design as shown in FIG. 9; a bundle of light fibers leading to a photo-multiplier; or other light channeling apparatus. By utilizing appropriate engineering techniques any of the well known methods and devices for detecting the presence of light and providing a corresponding electrical signal can be employed as the device 80. In any case it is important that the light from every cell in each of the panels 20 can reach the corresponding light detector 80. The light detector, however, need not know where in the plane the light is produced, since only one cell in each plane is read at one time. Therefore, as shown in FIG. 9, the flat phototube 80 above its corresponding panel 20 can receive light from all of the cells in the panel. Similarly, when using a bundle of light fibers each fiber can span many individual cells.

Suitable interrogating means can be employed to determine the state of selected cells within the array and the following is an illustrative example of such means. To read a word at address *r*, a read pulse, which may be similar to the sustaining signal of FIG. 5, is applied to the conductors *m* and *n*, at every plane during the time period between sustaining pulses. For each plane on which the *m, n* bit is a "1," a pulse appears at the output of the photo-tube for that plane. For each plane on which this bit is a "0" there is no pulse. The entire word therefore appears simultaneously at the output of the four phototubes. The remaining cells in row *m* and column *n* are, of course, excited with one-half amplitude pulses, but these produce no discharges and they do not change any states.

In the preferred embodiment of a memory unit utilizing the principles of the present invention, reference may now be made to FIG. 10 wherein 4 panel matrices 20 are arranged in a single plane with each serving the same function as described in connection with FIG. 9. It is understood, of course, that for simplicity in illustration of the memory apparatus the corresponding external conductors have not been shown. In this preferred embodiment, the panels 20 are addressed in the same way with their outputs being detected by a corresponding light detector apparatus 82. In the apparatus illustrated in FIG. 10 a lens 84 is provided for each of the panels 20 and is located directly above a corresponding panel to focus any incident light from such panel to a corresponding photo-multiplier 86. It may be noted that in this embodiment the lenses 84 can be more conveniently located to collect light for the photo-multipliers above. The photo-multiplier is a well known device which detects light energy (photons) and converts this energy into an amplified electrical signal.

It is understood, of course, that the memory apparatus illustrated in FIGS. 9 and 10 has been shown merely to illustrate the teachings of the present invention. In a practical memory the number of words and the number of bits per word will be larger, but the physical arrangement will be similar. If there are $[k]^2$ words the relation between the address of the word and the bit position is $$r=km+n$$

Furthermore, instead of light detecting means, suitable electrical interrogation techniques may be employed to detect the presence of cell wall charges.

As has been previously indicated, there must be a source of particles in order for the initial discharge to occur, and in most instances a sufficient supply of such particles is available such that the discharge may be initiated with only a slight and usually insignificant delay. However, it was mentioned that in order to provide a more reliable apparatus a supply of such particles can be supplied by periodically introducing a conditioning pulse. Another method which can be utilized to produce such particles is by photo-electric emission, and this property suggests an interesting application.

Assuming in the first instance that there is an insufficient number of charged particles in the volume and that furthermore no conditioning pulse is present, under these circumstances none of these cells will light when a starting pulse such as shown in FIG. 4 is applied to the cell. If we now project an image on the panel matrix by means of a lens, for instance, those cells which light above a certain threshold will change to the "1" state due to the introduction of a sufficient number of charged particles in the cell, while the remaining cells which have not received a sufficient amount of light above the threshold level will stay in the "0" state. Thus, the display now has the digitalized image in a form that can be viewed and that can also be processed directly by a computer. The property of photo-initiation can also be used to provide a graphic input to a computer. The programmer can write directly on the panel matrix with a light producing pen and the information is again available for viewing and for computer processing. It can also be seen that the memory unit can be used to process information directly on the panel in the manner of magnetic core memory storage units as used in digital computers.

It is to be understood, of course, that a number of panel matrices such as shown in FIG. 1 can be placed side by side so that their individual displays in a sense are added together. Such an arrangement can be provided for instance when it is desired to provide a large display.

The enhancement of the efficiency of gas discharge tubes through the use of phosphors is, of course, well known. An interesting extension of this technique is the deposition of different color phosphors over adjacent cells in the manner of the shadow mask television tubes. With three or four different phosphors each group of three or four cells forms a color unit and the display is capable of showing color images. Each of the color phosphors would be located at a corresponding intersection point so that it may be addressed. By suitably addressing the cells within a color unit, a variety of colors can be produced. The technique could even be combined with selective tinting of the glass to make possible a greater variety of effects.

In a constructed single minicell, 0.010 inch (10 mils) in diameter and height, which was used for initial investigative purposes, a mixture of neon and 5% nitrogen was maintained at a pressure of 320 millimeters of mercury which enabled the constructed cell to provide an intense discharge bright enough for display purposes and which created the aforementioned memory characteristic by virtue of the charged wall condition in the cell. In this instance the sustaining signal had a pulse width of 1.0 microsecond, a repetition time of approximately 100–200 microseconds, and an amplitude of approximately 700 volts between the external conductors. The discharge was initiated at approximately 600 volts and stabilized with the succeeding periodically applied sustaining signals at approximately 300 volts. We had also initially determined that a mixture of neon with 5–10% nitrogen at pressure levels between 315 millimeters to 420 millimeters of mercury enables the cells to operate satisfactorily for either display or memory purposes. We have now further determined that operations at the higher pressure level of 420 millimeters of mercury allows an increase in the time interval between the sustaining pulses which reignite the discharge. It is believed that the metastable atoms produced during the discharge are slowed down in their diffusion to the cell wall by the higher pressure to thereby enable a longer time interval for the presence of electrons which are ejected from the walls as they are struck by the metastable atoms.

In further studies and to further illustrate examples of the present invention we have used an 8 x 8 array of minicells 45 each being 0.015 inch (15 mils) in diameter and 0.006 inch (6 mils) in height. The cells have been filled with a mixture of neon and approximately 9 percent nitrogen at approximately 700 millimeters of mercury. Each of the conductors associated with the center four rows and columns were connected to an amplifier, and all eight amplifiers were driven by a single 500 kc. signal generator. The amplitude of the output signal at each line was set to one of three levels by transistor switches that were in turn controlled by manual switches, or through interface circuitry to a digital computer whose output controlled selection of the cells in the array. In the sustaining mode the signals on all lines are at the intermediate voltage level; the combined signals across the cells are all within the sustaining range; and the pattern on the display remains unchanged. When the signals on each of two intersecting conductors are raised to the highest level, the combined voltage across the cell at the intersection exceeds the firing voltage, and the cell is turned on. The voltage across the other cells adjacent to the selected lines also rises, but not enough to fire the cells. Similarly, when the signal on two intersecting lines is reduced to the lowest level, the voltage at the intersection falls below the minimum sustaining voltage and the cell is turned off. The voltage across the remaining cells along these lines is also reduced, but it also stays within the sustaining range.

We have determined that a minicell constructed according to the principles of this invention can operate in a pulsing discharge manner using a mixture of neon and approximately 2–10% nitrogen maintained at a pressure between 315 and 740 millimeters of mercury. We have also determined that for the most reliable operation in terms of stability of the firing and minimum sustaining voltage levels, with an acceptable range termed "memory margin" between these two levels, a mixture of neon and 9% nitrogen at 700 millimeters of mercury is most desirable. In the example of the 8 x 8 array under the aforementioned conditions we found the firing voltage required between conductors to be about 820 volts and the minimum sustaining voltage equal to about 520 volts. We found very small variations in these critical voltages and believe this is due to the fact that the portion of the Paschen curve that corresponds to these pressures is relatively flat. Not only are the critical voltages thus relatively insensitive to variation in pressure, but we have also found them to be insensitive to variations in the widths of the deposited electrodes, which were varied by as much as two to one with little effect.

It will be appreciated that the above parameters are given only as examples, since many of the benefits of a gas cell with wall charges operating in a pulsing discharge manner can be obtained with various other gases or gas mixtures at other pressure levels. Other gases and pressure ranges which will form wall charges under suitable conditions in accordance with the teachings herein can be readily obtained by those skilled in the art. Admittedly, the performances of such cells may be found to be superior or inferior to that in which a neon and 2–10% nitrogen mixture is used between the pressure ranges of 315–740 torr. Insofar as our preliminary investigations are concerned, we have been able to determine that for a neon and nitrogen mixture, the aforementioned conditions are preferred when used with the techniques herein described. Yet for many practical applications, it is possible that satisfactory wall charges can be formed in the cell so that a suitable memory margin is maintained using other gaseous mediums at other pressures.

It must be understood that the principle underlying the present invention is the formation of wall charges which are accordingly manipulated to impart information depending upon whether a display or a memory device is desired. Thus, it is within the teachings of this invention to include various well known alternative embodiments to utilize this principle. For instance, as mentioned previously an array of conductors can be externally placed on each side of electrically isolated but not physically isolated cells. As an example, there can be provided a homogeneous gaseous medium within non-conductive walls and intermediate a paired array of conductors which are adjacent the walls and external to the gaseous medium, so as to be conductively isolated from the gaseous medium. In this alternative embodiment the "cells" can be thought of as not being physically isolated. However, they are definitely electrically isolated since discrete wall charges can be selectively formed in accordance with this invention on the non-conductive cell walls adjacent each of the paired conductors. Another alternative is to include conductive plates inside the cells and immediately adjacent the cell walls. No direct electrical connection is made to the plates so that they are conductively isolated from each other, enabling the necessary charges to build up on the wall plate or plates. The sustaining signals and the selection and control signals can be coupled to the cells in the same manner as previously described.

Thus, we have provided a novel gaseous discharge cell adaptable for use in information systems, in which the electrodes are mounted externally and insulated from the cell itself, and in which a gaseous medium has been employed such that an intense discharge is produced which causes a rapid flow of charges to the walls which quickly extinguishes the discharge. By utilizing the teachings herein, displays with more than 10,000 discretely addressable light sources per square inch can be constructed. It is also possible that for very large displays—for instance, a complete wall display—larger size cells may be more suitable, and may be provided by using a lower pressure with the voltages remaining approximately the same.

In addition, the information entered into a panel array can be read non-destructively directly from the display. For this reason, it should be possible to develop large capacity memories with even greater densities, and with access time of the order of a few microseconds.

It is further to be noted that other mediums could be used to perform in a similar manner as the gaseous medium disclosed herein. For instance, one could substitute for the gas a solid state material which would accomplish the same function as the gaseous medium.

Figure 11:
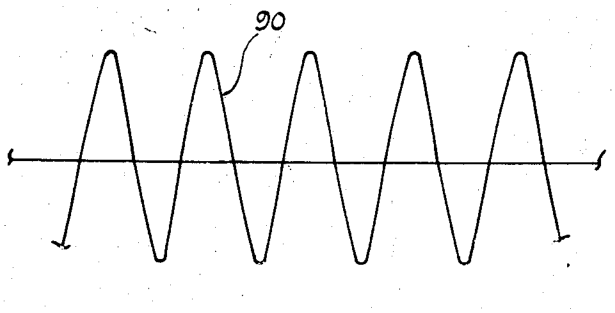
FIG. 11 is a schematic illustration of a sinusoidal signal which is an alternative form of applied signal for controlling formation of the wall charges in accordance with the principles of this invention.

In FIG. 11 there is illustrated a continuous sinusoidal signal 90 which as previously mentioned can be used in the alternative as a suitable driving signal for manipulating the wall charges in selected cells. By only illustrating the pulse type signals of FIGS. 4–7 and the sinusoidal type signal of FIG. 11, it is not to be assumed that the invention is so limited to these two types of signals alone, since any form of signal which is capable of manipulating the wall charges as hereinbefore described is within the teachings and scope of this invention.

Figures 12, 13:
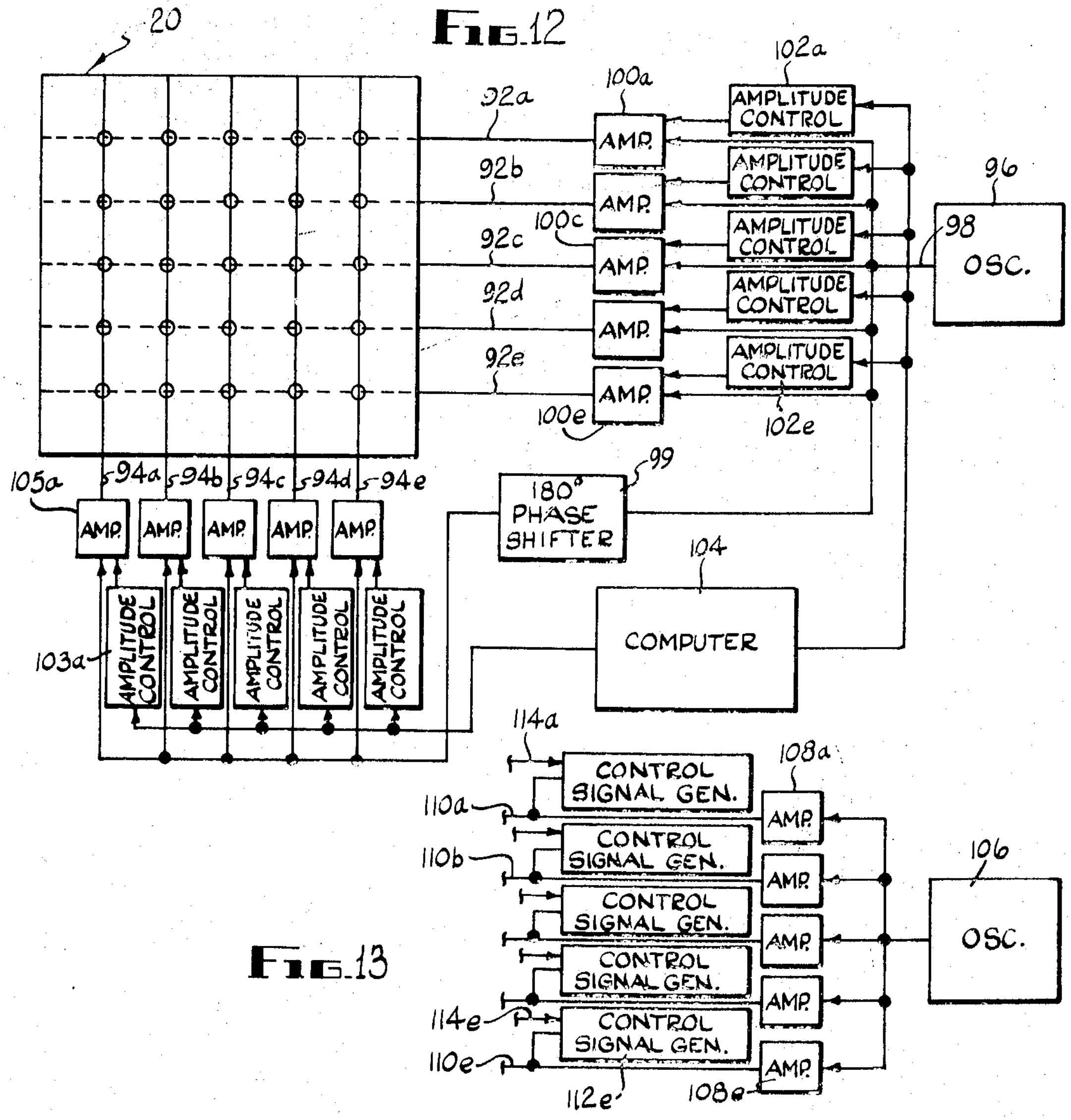
FIG. 12 is a schematic diagram illustrating apparatus utilizing the signal shown in FIG. 11 for manipulating the wall charges of selected cells in a panel array in order to impart information.
FIG. 13 is a schematic diagram of an alternative embodiment of apparatus using the signal shown in FIG. 11 for manipulating the wall charges.

FIG. 12 illustrates apparatus in which a sinusoidal type signal, such as is shown in FIG. 11, is utilized to control the wall charges of selected cells. A panel array 20, as previously described, includes two sets of intersecting conductors external to the cells, and which are coupled to suitable corresponding conductors **92*a*–92*e* and 94*a*–94*e***.

An oscillator 96 provides an output signal on line 98 corresponding to the sinusoidal signal 90. Suitable amplifiers may be provided if desired in line 98 to increase the signal amplitude before coupling signal 90 to a series of line drive amplifiers **100*a*–100*e* which are respectively coupled to the conductors 92*a*–92*e*. In a balanced manner, similar signals of opposite polarity are coupled to conductors 94*a*–94*e* by connecting the output of oscillator 96 to a 180° phase shift device or network 99** so that the voltage between the two sets of conductors is equal to twice the voltage on each set.

When no information is being transferred into or out of the panel array, the combination of the signals 90 on each set of conductors is less than the required firing voltage of the cells—thus similar in operation to the sustaining signals shown in FIG. 5. Changing of the state of a selected cell, which as described before is accomplished by manipulating the wall charges, can be provided by suitably varying the amplitude of the drive signal so that at a high level the cell is turned "on," while at a low level the cell is turned "off." One technique is as shown in FIG. 12, wherein the gain characteristics of the corresponding line drive amplifier is varied by means of respective amplitude control circuits **102*a*–102*e*, comprising any one of a number of well-known types of circuits, such as variable impedance circuits, for performing this function. Similar line drive amplifiers and amplitude control circuits are also connected to the conductor set 94*a*–94*e***.

As an example, if it is desired to change the state of the cell at the intersection of conductors **92*a* and 94*a*, amplitude control means 102*a* is operated to vary the gain characteristics of line drive amplifier 100*a* and amplitude control means 103*a* is operated to vary the gain characteristics of line drive amplifier 105***a*, so as to increase the total voltage level across these conductors above the required firing level. When the voltage is thereafter reduced to the normal sustaining signal, this level is sufficient to maintain the cell in the "on" state with wall charges in the manner as described before, with the cell discharging once each half cycle of the applied sustaining signal. Changing the cell to the "off" state is similarly accomplished by lowering the amplitude of the corresponding drive signal by means of the respective amplitude control circuits. This reduces the total voltage across the cell below that required to cause a discharge. Furthermore, it leaves the cell with a sufficiently small wall charge, so that even when the signal is increased to the normal sustaining magnitude, the voltage due to the drive signal combined with the voltage due to the wall charges will not re-ignite the cell.

If desired, the amplitude of the drive signal 90 can be controlled by coupling suitable output signals from a computer 104. FIG. 13 illustrates an alternative embodiment wherein an oscillator 106 is coupled to a series of line drive amplifiers 108*a*–108*e*, one for each respective conductor 110*a*–110*e*. A similar set of apparatus is connected to the other set of conductors, including a 180° phase shifter. However, for convenience only one set of apparatus is shown in FIG. 13. The output of each amplifier is a sinusoidal type signal 90 of "sustaining level" but not sufficient by itself to ignite a cell without wall charges. By coupling either in phase or out of phase signals from the output of a corresponding control signal generator 112*a*–112*e*, the selected cell can be respectively placed "on" or "off." Timing and selection of the correct control signal can be controlled by the output of a computer through output computer lines 114*a*–114*e*.

Figure 14:
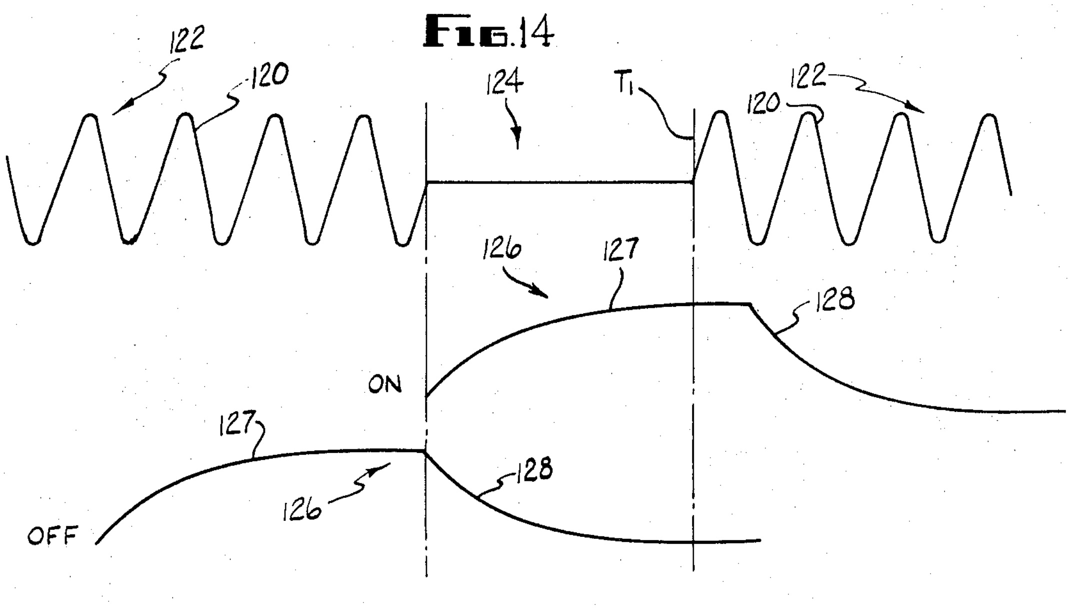
FIG. 14 is a schematic illustration of an interrupted sinusoidal sustaining signal and of suitable control signals applied during the gap for controlling information in accordance with the principles of this invention.

FIG. 14 illustrates an interrupted sinusoidal sustaining signal 120 which can be utilized as an alternative signal for controlling the wall charges in accordance with one aspect of this invention. It may be noted that the signal 120 is interrupted so as to be present during a period noted generally by the reference character 122 separated by a gap 124 during which the signal 120 is not present. Suitable control signals are applied to increase or decrease the bias level of the interrupted sinusoidal drive signal 120 so as to selectively control the wall charges and thereby switch between respective states of the bistable cell device.

As an example, there is illustrated, in FIG. 14, a control signal 126 with an increasing voltage level portion 127 which is applied during the gap 124. The magnitude of the interrupted sinusoidal sustaining signal 120 is arranged such that this signal alone is insufficient to switch states. Therefore, to drive a cell from the "off" state to the "on" state, the control signal 126 is applied with the increasing voltage level portion 127 occurring during the gap 124 (see signal designated as "on" in FIG. 14), such that when the signal 120 is again present after time $T_1$, as indicated by this general reference character in FIG. 14, the magnitude of the voltage from the combination of signal 120 and signal 126 will be sufficient to discharge the cell after time $T_1$. Of course after the initial discharge, a similar discharge occurs once during each half cycle of the sustaining signal 120. When the bias is removed by the decreasing voltage portion 128 of the control signal 126, the differential charging from discharge to discharge allows the average wall voltage to track the signal 126. Finally, after the bias has been removed, the cell fires once each half cycle at times when the slopes are equal, and when the amounts of wall charging are also equal.

In order to change the state of a cell from "on" to "off," the bias is raised before the gap. Reference may be had to the signal designated as "off" in FIG. 14. As before, the differential charging allows the average wall voltage to track the increasing portion 127 of the signal 126. The last firing, before the gap, leaves the wall voltage at a level such that the sustaining voltage, in the absence of bias, would be insufficient to cause a discharge. During the gap the bias is removed by the decreasing portion 128 of the control signal 126, and when the sustaining signal is resumed at time $T_1$, the cell cannot fire, and it remains in the "zero" state. For both write (change of state from "zero" to "one") and erase (change of state from "one" to "zero"), the bias at cells in the same row or the same column as the selected cell is one half that at the selected cell. These smaller voltage changes cannot change the states of a cell. For these cells, and for the remaining cells in the array which have no bias changes, the wall charges "remember" the cell state in each cell through the gap interval. It is to be understood that, as previously described, the sinusoidal sustaining signals, as shown in FIGS. 11 and 14, are applied to the grids on array 20 after the state of the cell has been changed, and until the state of another cell is also to be changed. It should be pointed out, however, that gaps in the sinusoidal sustaining signal could be provided periodically, such as the gap 124 in signal 122 shown in FIG. 14, without interfering with the successful operation of the device.

Control signal 126 is applied through suitable switching networks to the corresponding row and column conductors of a selected cell for controlling turn-on and turn-off of the cell. This technique may be termed a "slow-write and slow-erase" of the cell array since information is entered into and removed from the cells in a relatively longer time than in the previously described techniques. However, the writing and erasing rates obtainable from this technique are suitable for many applications so that a choice can be made corresponding to the intended use of the cell array and other pertinent factors.

As an example of this technique, we have utilized a 50 kc. sinusoidal sustaining signal 120. The voltage required across the intersecting conductors to fire a cell was about 750 volts, while the sustaining voltage was about 600 volts. Using a gap period of about 40 microseconds, the total voltage change required of the control signal was about 320 volts. Thus voltage is across both of the cell conductors, so that only a 160 volt change need be supplied to each conductor. We found that under these conditions the gap could be increased to 50 microseconds with little change in the memory margin. However, the memory margin tended to decrease with increases of the gap period beyond 50 microseconds.

Figures 15, 16:
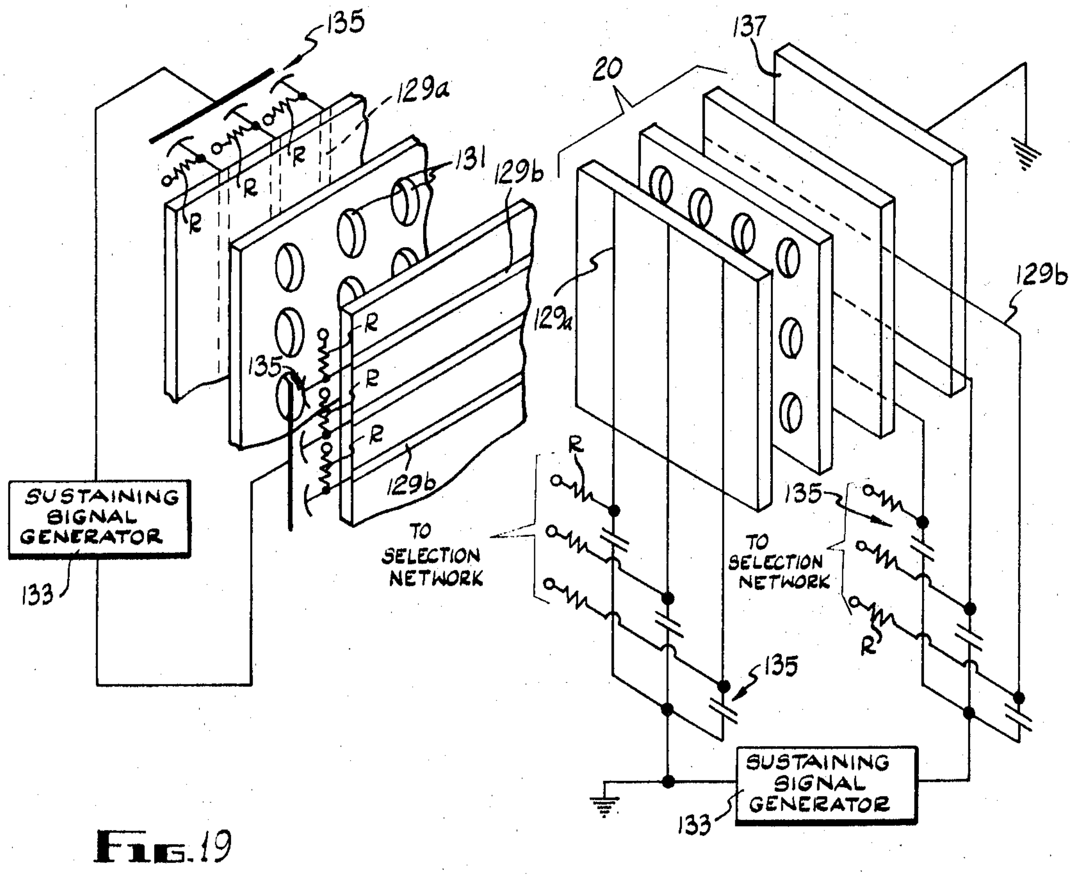
FIG. 15 is a schematic illustration of one embodiment of this invention wherein the sustaining signals are capacitively coupled to both sets of conductors, and wherein the selection signals are coupled through a resistance to the desired pair of intersecting conductors.
FIG. 16 is a schematic illustration of another embodiment of this invention which is especially useful for R.F. shielding of the panel array.

The control signal 126 can be provided by charging the natural capacitance at a driving electrode through a suitable resistance. A typical procedure is shown in FIG. 15, in which there is shown a fragment of a panel array 20 having transparent respective column and row conductors 129*a* and 129*b* aligned with crossing rows and columns of cells 131. A sustaining signal generator 133 supplies sustaining signals to the column and row conductors through suitable capacitive means 135. Selection signals from a selection network are coupled through the resistors R to the corresponding conductor.

If the cell selected is in Row 1, the select signal at terminal $R_1$ is a flat top pulse whose rise and fall times are, for instance, small compared to the desired time constant for the control signal 126, and whose amplitude is one half that required to cause a change of state in a cell. The value of the charging resistance R is chosen so that in conjunction with the natural capacitance at Row 1, it provides the appropriately shaped control signal at the driving electrode. Of course a similar signal of opposite polarity must be applied to the column electrode that corresponds to the addressed cell. The quiescent voltages at the two sets of driving electrodes can be equal, but this is not necessary. In fact, a circuit simplification can be achieved if the two equiescent voltage levels differ by one half the total voltage change required to effect a selection. With this condition the generator can be a symmetrical flip-flop circuit which, in one state, provides these two voltages at its output terminals. The control signal is then generated by changing the state of the flip-flop for the required time and then changing it back to its original state.

In this slow addressing mode, the panel can be addressed in a balanced manner, as described above for the faster mode. Several advantages can be gained, however, if the front set of electrodes is at A.C. ground and if the entire panel is backed by an additional conductor which is grounded. This configuration is shown in FIG. 16, wherein the previously described array 20 is coupled to a sustaining signal generator 133 through suitable capacitive means 135, and to a selection network through resistors R. Notice in FIG. 16 that the front set of conductors (column conductors 129*a*) are A.C. connected to the grounded side of the sustaining signal generator 133, and that a panel conductor 137, in back of the entire set of other conductors (row conductors 129*b*), is also grounded. Insofar as radiation is concerned, the assembly behaves much like a coaxial cable with the front column conductors 129*a* and the back conductor plate 137 serving as electrical shields. The radiation is thus effectively confined to the panel itself. In addition, the sustaining signal generator need supply only a single ended signal and thus can be simpler than a generator with a balanced output.

Figure 17:
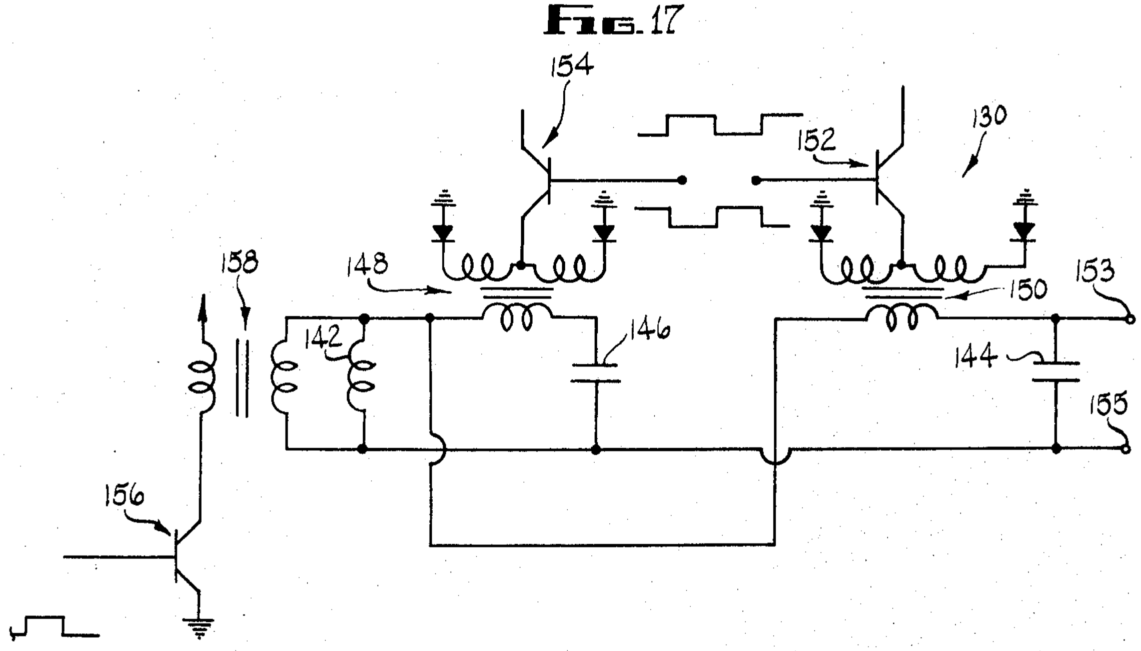
FIG. 17 is a detailed schematic diagram illustrating one form of apparatus for generating the interrupted sinusoidal signals of FIG. 14.

Referring now to FIG. 17, the schematic diagram illustrates a generator that provides a sinusoidal sustaining signal that can be interrupted as shown in FIG. 14. In normal low current, low voltage applications, an interrupted sine wave signal can be generated a number of ways. In the present application, however, voltages as high as 1200 volts may be required; and, in an essentially capacitive load, the current may be as high as 4 amperes. The problem, therefore, is to generate the interrupted sine wave signal of FIG. 14, and at the same time to keep the energy dissipation small.

The natural way to conserve energy in a sinusoidal signal is to develop the voltage across a tuned circuit. Switching energy in and out of the tuned circuit qiuckly, however, is difficult. The generator 130 is a circuit which interchanges a load capacitor with a dummy capacitor at precisely defined times, thus developing the correct wave form without excessive dissipation of energy. An important aspect of the generator 130 is that, although the output voltages are high, the actual switching is performed by transistors at low impedance, low voltage levels.

Figure 18:
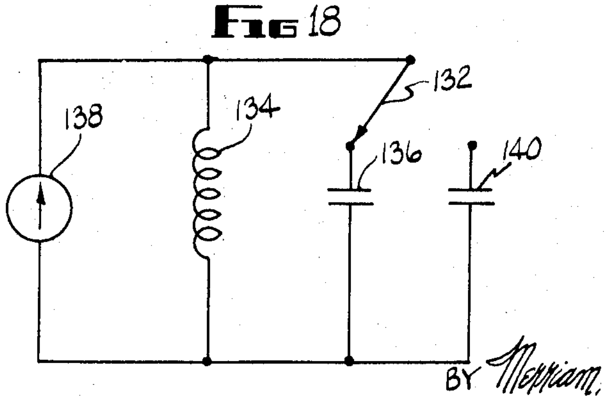
FIG. 18 is a simplified schematic diagram of the circuit shown in FIG. 17 for illustrating the principle of operation.

The basic switching principle is illustrated in the simplified circuit diagram of FIG. 18. When the switch 132 is in the left position as shown in this figure, the inductance 134 and the capacitor 136 form a resonant circuit which is driven at the resonant frequency by the current generator 138. Once each half cycle, the voltage across load capacitor 136 is zero, and the energy is stored entirely in the magnetic field of the inductance. We assume now that, at one of these times, the switch is thrown to dummy capacitor 140 in response to a control signal, and that contact to capacitor 140 is made before the contact to capacitor 136 is broken. Since the energy in the capacitors is zero, no energy is dissipated in the switch. Before the switching instant, the voltage across load capacitor 136 is sinusoidal; after it is zero. Similarly, at a later time, when the energy is again stored in the magnetic field, the switching is reversed, and the voltage across capacitor 136 is again sinusoidal with the original amplitudes.

In practice the switch does not simply open and short the connections from the capacitors 136 and 140 to the inductance 134. Instead, it changes impedance in these connecting lines, so that when the switch is driven, the signal across capacitors 136 or 140 differs from that in FIG. 14 only in that the amplitude of the sine wave drops to a small value instead of zero.

Referring now to the generator 130 shown in FIG. 17, the inductance 142 and the equal capacitors 144 and 146 play the same role as the inductance 134 and the respective capacitors 136 and 140 in the simplified circuit of FIG. 18. Switching is performed by controlling the impedances reflected into the circuit through the transformers 148 and 150. For example, when transistor 152 is cut off, the impedance in series with the load capacitor 144 is just the leakage reactance of the secondary of transformer 150. This is chosen to be high. Thus the voltage across capacitor 144 is low. During this time the transistor 154 is saturated, current can flow in one or the other of the half primaries, and the reflected impedance is low. The circuit loop containing inductance 142, dummy capacitor 146 and the reflected impedance at this time is a high Q (about 10) resonant circuit, and the voltage across capacitor 146 is high. On the other hand, if transistor 152 is saturated and transistor 154 is cut off, the voltage across capacitor 144 is high, and the voltage across capacitor 146 is low. The input signal energy is coupled into the circuit through a drive transistor 156 and a 30:1 step-up transformer 158.

Thus, in the preferred mode of operation, the transistor 152 is saturated, and transistor 154 is cut off so that the input signal appears as a continuous sinusoidal sustaining signal at output terminals 153 and 155 across the load capacitor 144. The sustaining signal can then be selectively interrupted, in order to couple control signals to the array 20, by coupling suitable signals to transistors 152 and 154, thereby driving transistor 152 to cut off and transistor 154 to saturation. In the alternative, the sustaining signal can be periodically interrupted by coupling, respectively to transistors 152 and 154, two square wave signals synchronously opposite in polarity, so as to alternately drive the transistors between cut off and saturation. A circuit based on these principles has been constructed which switches voltages at 600 volts, and which maintains a 40 to 1 ratio of voltages across the capacitors.

Referring to FIGS. 19 and 19(*a*), an alternate technique can also be employed to provide an interrupted sinusoidal voltage. If an input step voltage wave form 145 is applied from a suitable generator 157 to a simple series resonant capacitive-inductive circuit 147 as shown in FIG. 19(*a*), the output voltage across the capacitor C is a cosinusoidal signal 149 with an average voltage equal to the peak voltage. The precise description of the wave form 149, from $t=0$ to $t=T$, is $$V_C=A(1-\cos 2\pi ft)$$

where A is the average voltage and also is the peak voltage of the cosinusoidal signal 149; and $f$ is the resonant frequency of the signal.

Note that at the end of one period T, where $T=1/f$, the voltage is zero. At this time, the energy in the circuit is zero, all of it having been returned to the generator. If at this time, the signal voltage 145 is diminished by an amount 2A, a second cosinusoidal voltage 151 (from $t=T$ to $t=2T$) is developed across the capacitance C, and at time 2T the voltage across the capacitance C is again zero. If the input voltage 145 is reduced to zero at this time, the output voltage remains at zero. If, on the other hand, the input voltage alternates between plus A and minus A once each period, a continuous voltage appears across the capacitance C.

By interrupting the input square wave 145 at some time $m$T, and resuming it at some later time $n$T, where $m$ and $n$ are integers, an interrupted voltage can be generated which is suitable for driving the display matrix. The required step voltage 145 can be provided by a transistor drive circuit if a closely coupled transformer is used between the drive circuit and the simple series resonant circuit shown in FIG. 19(*a*). A generator based on this principle has been successfully used to drive the display matrix.

In accordance with another aspect of this invention, the cell array 20 as previously described can be provided such that certain "on" cells will be in a first "on" state, whereas other "on" cells will be in a second "on" state. Such a condition can be provided in the following manner. As previously mentioned, it has been found that the amount of wall charge formed within the inner cell is sensitive to the slope of the actuating drive signal. In the case of a continuous sinusoidal drive signal, shown in FIG. 11, the amount of wall charging is the same at each discharge, and the slopes of the voltage wave at the firing times will be equal. This is approximately true for the pulse "one cycle" type shown in FIG. 5, the differences in wall charging being accounted for by charge leakage between pulses.

If the sinusoidal shape is distorted in a manner as shown in FIG. 20, two stable "on" states can be provided. Non-sinusoidal drive signal 160 is formed such that the positive half cycle portion extends to a higher voltage magnitude. Assuming that a cell is discharged at the reference point 162 on the positive half cycle of signal 160, a discharge will again occur at the point 164 on the negative half cycle. This result is obtained because the slope of the drive signal 160 is approximately equal at point 162 and point 164 thereon.

Drive signal 166 is similar in shape and symmetrical about the zero reference axis to signal 160. It may be noted that the negative half cycle portion of signal 166 extends to a higher magnitude than the positive half cycle portion thereof. A cell responsive to signal 166 will discharge on the negative half cycle approximately at reference point 168, and on the succeeding positive half cycle at a reference point 170, where the slope of signal 166 is approximately equal to that at point 168. Such a cell would have a different "on" state than the previous cell which is in an "on" state corresponding to signal 160. For convenience, these two stable "on" states can be termed A and B.

If we assume that a first cell is in "on" state A corresponding to drive signal 160, application of signal 166 to this cell will have no effect. This result is obtained because the negative half cycle portion of signal 166 is opposite in polarity to the voltage due to the wall charges formed in the particular cell during the negative half cycle portion of signal 160; so that a combination of the applied signal 166 and the voltage due to the wall charges does not exceed the required firing voltage. During the positive half cycle portion of signal 166 the applied signal has the same polarity and, therefore, adds to the voltage resulting from the wall charges developed during the negative half cycle of signal 160. However, the combination of these two voltage levels does not exceed the required firing voltage. Therefore, cells in the array 20 which are in the A "on" state are not effected by the signal 166 which controls only the cells in the B "on" state. Similarly, signal 160 has no effect on cells in the B "on" state. Thus, an array 20 can be provided with some cells in the A "on" state while others are simultaneously in the B "on" state.

This technique is particularly applicable to use in memory apparatus wherein, instead of transferring information by changing the cells from an "off" state to an "on" state information can be transferred by changing between the two "on" states, A and B.

This technique may also find application in display apparatus wherein there can be provided a first display on the cell array corresponding to cells in the A "on" state, and a second display in the same array corresponding to cells in the B "on" state. This enables the same cell array to be utilized for two separate and distinct images.

In FIG. 21 there is illustrated a technique utilizing the basic gaseous discharge cell of this invention to provide the display with contrast—commonly known as gray scale. A fragment 170 of an array is shown in FIG. 21 which is constructed similar to that shown for the array 20. In particular, each of the cells 172–178 contains an isolated gas medium within suitable insulating material 180 with a pair of electrodes such as electrodes 182 and 184 on opposite sides of the insulating material 180 and external to the gaseous medium within each respective cell. The cells 172–178 comprise a spot cell cluster, each cell of which can be selectively addressed resulting in a display having binary stepped intensity. As shown in FIG. 21 each of the cells is covered with a respective screen 186–192 so that the light emitted from cells 172–178 varies in the respective amounts one half, one fourth, one eighth and one sixteenth relative to the total cluster intensity.

Therefore, assuming, for display purposes, that the particular display spot represented by the cluster 170 on the array is to be completely darkened, none of these cells in cluster 170 are ignited. If this spot represented by cluster 170 is to emit a finite amount of light, cell 178 is ignited and by means of the screen 192 a small amount of light is emitted therefrom. The amount of light emitted from this cluster can thus be controlled by selectively addressing none, one, or any combination of the cells in the cluster thus providing a gray scale and a variable level of brightness.

It is understood, of course, that the array can comprise a plurality of such clusters, with the spacing between the individual cells and between clusters designed in a manner suitable to the resolution desired for the particular display application. The screening 186–192 can also be provided by photographic emulsions on the insulator 180 in the form of a dot filter.

For display purposes variable contrast or gray scale is a physiological variable. A varible contrast can, therefore, be provided without changing light intensity by varying the time that a cell is in the "1" state with respect to the time that is in the "0" state. This may be termed the "duty cycle technique." The basic interval in which the cell is in both states must be sufficiently small so that it can be repeated periodically without causing flicker. Consider, for example, a basic interval of a thirtieth of a second—the frame time of standard television. To an observer, maximum apparent brightness occurs when the cell is in the "1" state during the entire interval. If the cell is in the "0" state at the beginning of the interval, the interval, the apparent brightness can be varied from the maximum down to zero by appropriately delaying the transistion to the "1" state.

This can be accomplished in the plasma display cell in several ways. Consider first, that the sustaining signal is steadily increased over the interval from somewhat below the extinguishing voltage to somewhat above the firing voltage. If then, the initial wall charge of a cell is zero, the cell will make the transition from the "0" to the "1" state near the end of the interval. The greater the initial wall charge, the earlier in the interval the transition takes place. Finally, if the initial wall charge is equal to the difference between the firing voltage and the extinguishing voltage, the transition occurs quickly after the beginning of the interval. In this technique, of course, the sustaining signal is increased over the interval not in just one cell, but on all cells of the display simultaneously. Each cell, however, in the display, makes its transition according to its respective initial wall charge.

In a variation of this technique, the amplitude of the sustaining signal is kept constant, and a linearly increasing voltage is superimposed on the sustaining voltage over the entire interval. Again, the transition for each cell from the "0" to the "1" state is controlled by the amount of the initial wall charge.

The amount of the initial wall charge can be controlled by a procedure that is similar to the slow-write technique described above in connection with FIG. 14.

The cell is first fired by superimposing on the sustaining voltage a slowly increasing voltage, which we previously referred to as the bias. Once the cell fires, the sequence of discharges is maintained, and the average wall voltage tracks the bias in the usual way as was described above. The bias is adjusted to the appropriate voltage for the initial wall charge, and the sustaining voltage is interrupted after the appropriate discharge. For example, if the initial wall voltage is to be set a small amount above zero, the firing sequence is started as described, and the bias is then adjusted until the wall voltage, after the discharges that occur on, for instance, the lower half cycle, is at the desired level. The alternate discharges, of course, leave the walls adjusted to entirely different voltages.

After one of the lower half cycle discharges, the sustaining voltage is removed, as described earlier in the discussion of FIG. 14. The bias is then also removed, and the wall voltage is at the desired level.

The appropriate initial wall voltages can be set in all cells in one line by applying part of the bias voltage to the electrode that is common to all cells, together with appropriate voltages on the intersecting electrodes that are unique to each cell. Actually, the entire bias voltage could be supplied to the electrode unique to each cell, with the common electrode being left unchanged.

FIG. 22 is an illustration of a technique previously mentioned for providing a multi-color display. A group or cluster of three or four cells can be combined to form a color unit. A single cell of such a unit is shown in the sectional view of FIG. 19, for illustration. It has been found, in our investigations of the basic gaseous discharge cell, that a significant amount of the radiant energy emitted by the cell during discharge resides in the near ultraviolet region. This condition can be utilized by providing a phosphor coating 194 inside the cell 196 formed within a suitable insulator 198. When a suitable discharge signal is connected to the intersecting external electrodes 200 and 202, the gaseous medium in the cell is discharged, and the phosphor responds to the emitted energy in the ultra-violet region so as to emit the desired light color. By suitably placing different types of phosphors in respective cells of each cluster, a variety of color effects may be obtained by selectively addressing any combination of cells in each cluster.

Each cluster can be constructed similar in form to that illustrated in FIG. 21. Alternatively, the glass insulating material can be of the type, such as quartz, which will more efficiently transmit the proper ultra-violet radiation emitted from a selected cell to different phosphor films on the outside of the gass cell. As mentioned previously several colors can also be provided by selectively tinting the glass in front of the cells. Thus if a color cluster contains four cells, for example, the glass in front of one cell might be colored red, a second green, a third blue, and a fourth yellow. The glass in front of the fourth cell could also be clear. The two techniques, use of phosphors and use of colored glass, can of course be combined.

FIG. 23 illustrates apparatus for writing information into the cell array 20 in a line-by-line manner from the output of a computer 210. The computer 210 receives input data 212 from a variety of sources, and in various formats, which are then processed in the computer. Output information from the computers is coupled through suitable switching networks 214 and written into the array 20. FIG. 23 also shows a recording device for making permanent records of the images on the display. As will be seen later, techniques are available for presenting information rapidly in a form that is suitable for recording. A sustaining signal generator 218 supplies, for example, any one of the types of sustaining signals previously described for maintaining the cells in their selected stable states. Changing the states of selected cells is provided by suitable signals from computer 210 coupled through the switching network. It is to be understood that a balanced arrangement can be provided, wherein a switching network and sustaining signal generator for each of the two sets of conductors would be required.

It may be noted that more than one cell can be turned "on" (changed from "0" to "1") or turned "off" (changed from "1" to "0") simultaneously. Thus, if write signals are connected to M row electrodes and N column electrodes, the cells at every one of the M times N intersections will be turned "on." Similarly, if erase signals are connected to these electrodes, the M times N cells will be turned off. In applications, this technique can increase the information transfer rate considerably.

In computer based education systems, and in other information retrieval systems, it is often necessary to erase just one character, or just one line of characters. Either of these operations can be carried out in one erase cycle by addressing all appropriate electrodes at once. For example, a character written on a raster of 7 x 5 cells can be erased by connecting erase signals to the 7 rows and the 5 columns that define that raster. Of course, in the process, erase signals are also sent to cells that are already "off" but these cells simply remain in the "0" state. In a similar manner, a line of characters can be erased, and, in fact, the entire display can be erased if erase signals are connected to all electrodes in the display.

For purposes of illustration, reference may be had to FIG. 23, wherein there is shown an array 20 similar in construction to the array 20 shown, for instance, in FIG. 1, with the two sets of conductors not being shown only to facilitate the display illustration. In an important special case, a single line of cells, or part of a single line, is written or erased. For example, if an erase signal is applied to the row electrode **217*a* and corresponding erase signals are applied to all column electrodes, 219*a* through 219*z*, the entire line will be erased. If a write signal is then applied to row electrode 217*a***, and if simultaneously the corresponding write signal is applied to selected columns, an entire line of information is written in one write cycle. Other lines can be written in a similar manner. Thus, if the entire display is erased at once in the manner described above, the complete display can be written in as many write cycles as there are rows which contain lighted cells.

An important application of line by line writing is the preparation of information for recording. Referring to FIG. 23, we assume that the array consists of 512 rows and 512 columns. The display is first erased in one erase cycle in the manner described above. The information is then written on the display, one line at a time, beginning with row **217*a*. After 512 write cycles, the complete image is on the display. Next, the display is erased, one line at a time, beginning with line 217*a*** and in 512 erase cycles, the display has been completely erased.

While it is not necessary that the write and erase cycles be equal, it is convenient in the addressing procedures described above to make them equal. Using the term "select" cycle for either a write cycle or an erase cycle, we note that each line provides light for 512 select cycles, thus providing uniform exposure for the entire image. If a select cycle is one microsecond, an entire page could be recorded in a little over one millisecond. Thus, assuming that a recording device 216 could match the information input capability of the display, information could be recorded at the rate of about 1,000 pages per second. Even with slow write-slow erase procedures described above, recording rates of 10 to 100 pages per second are possible.

It is sometimes convenient to write in a character by character mode. The writing speed can be increased over the point-by-point procedure by writing in one select cycle all required cells in the same column. Thus, if the character is written on a raster of 7 rows and 5 columns, the character may be written in five select cycles. An entire character line can be written in this manner by addressing, with appropriate drive signals, the appropriate rows of cells in a group of adjacent rows in the array, starting, for instance, with the group consisting of rows 217$a$–217$d$ at the top of array 20. By sequentially addressing the required columns, from one end of the array to the other, the desired cells in each of the selected rows can be turned "on" and a line of output information from the computer written into the array as shown in FIG. 20. Application of the select signals to the rows is synchronized with the application of select signals to the columns, in order that the required discharge signal is presented to the corresponding intersecting electrodes of the cells which are to be ignited. Any of the described drive signals-pulsed, sinusoidal, or the "slow-write, slow-erase" type can be used.

Thus, the information is written into the array sequentially from the first character line, consisting of for example rows 217$a$–217$d$, to the last character line (rows 217$w$–217$z$), with each line being written sequentially from the first column 219$a$, at one end of the array, to the last column 219$z$, at the other end of the array.

As mentioned previously, selected cells in an array can be energized by directing a beam of light to these cells, such as from a light pen-type instrument or from light directed through a photographic negative, for instance, to transfer an image to the array. One technique is to present the bright light while simultaneously raising the drive signal voltage level to change the states of selected cells. Another technique is to utilize a sustaining type signal and to produce photoelectrons in the cell at an opportune time during the signal cycle.

Referring to FIG. 24, there is illustrated a continuous sinusoidal sustaining signal 220 which can be applied to all rows and column electrodes of the array. The magnitude of the signal 220 is, of course, not sufficient by itself to change cell states. At a point of time in the signal cycle, identified by the reference character 222, photoelectrons are introduced into the cell by means of a flash of light indicated as a burst 224. The photoelectrons in the cell rapidly respond to the electric field to neutralize it, thus forming a wall charge condition such that on the negative half cycle portion of signal 220, the cell discharges at reference point 226 because the combination of the applied signal voltage at this level and the voltage due to the wall charges formed from the introduced photoelectrons exceeds the required firing voltage. A discharge again occurs at reference point 228 on the positive half cycle of signal 220 in the normal manner.

In order to turn the cell "off," it is necessary to reduce the wall charges sufficiently before the next half cycle of the applied signal. As is shown in FIG. 24 at reference point 230, which is just before the signal 220 crosses the zero reference axis, a burst of flash of light is again applied to the cell. This neutralizes the effect of the previous wall charges so that the cell does not fire on the negative half cycle of the signal 220.

Even if the photoelectrons are not produced rapidly enough, a variation of this technique is possible, using a programmed gap in the sustaining signal. After the beginning of the gap, the bias level of the sustaining signal is reduced through a circuit having a time constant, so as to provide a slowly decreasing voltage. Now the light source is turned on, and kept on, until enough photoelectrons have been produced to discharge the walls. Immediately thereafter, but still within the gap of the sustaining signal, a bias voltage change opposite to that previously described is initiated, such that when the gap period is over, and the sustaining signal is again resumed, the wall charge is enough to insure the firing before the peak of the sustaining signal. The cell, if it is "0" initially, is now "1." If, on the other hand, the cell is initially in the "1" state, the walls are charged at the beginning of the gap, and it is thus only necessary to then produce enough photoelectrons in the cell to discharge the wall during the gap time in order to change the state of the cell to "0." This can be accomplished by directing a light beam onto the cell during a gap so as to produce the photoelectrons. Notice that using this technique, a high intensity light beam and precise timing of the illumination on the cell with respect to the continuous sinusoidal signal, as previously mentioned, is not required. Since photoelectrons are produced during the gap time, a less intense light source could be utilized.

Some of the previously mentioned apparatus and techniques can be combined for use in the television art. For instance, line-by-line writing of information into the cell array as previously mentioned is similar to the manner in which display information is presently utilized in a television receiver for driving the cathode ray tube in a line-by-line manner to form the composite picture. Furthermore, the previously mentioned capability of utilizing an array of cell clusters, in which selected cells or combinations thereof can be actuated for different desired intensities, enables the display to exhibit a variable contrast or gray scale which is desirable for television applications.

In addition, another technique designated as the "duty cycle technique" can also provide variable contrast or gray scale. This technique was previously described.

In standard black and white television practice, the signals are processed as they are received, and the image is drawn on the cathode ray tube one line after the other. Each line is drawn from left to right in about 60 microseconds. With the panel display, the entire line is written in one light cycle. The decoder 244 and the encoder 246, shown in FIG. 25, represent the circuits that process the information in a single TV line for writing into the display. This processing can take up to about 60 microseconds to complete. At the end of this time, it must transfer the information to the driver and it must accept another TV line for processing. The combination of various color capabilities with different phosphors, along with either gray scale technique in a cell array, would be highly desirable as a multi-color display device for use in a color television receiver.

It is well within the scope of the invention to combine the teachings herein in order to effectively replace the normal black and white cathode ray tube in a television receiver with an array of clustered cells or with the duty cycle technique according to this invention for exhibiting black and white television pictures with, of course, the necessary gray scale.

Referring to FIG. 25, there is illustrated, in block diagram form, a television receiver 240 having the aforementioned capabilities. An antenna 242 receives frequencies in the television band containing the normal black and white information, synchronization signals, etc. in the standard format.

Because the received information is not in the proper format for driving the cell array of this invention, the signal must be coupled to decoder 244 and encoder 246. The decoder 244 and encoder 246 cooperate to take the received display information, in analog form in a standard TV signal, decode this information and then put the information into a proper digital format for driving the cell array 248.

A sustaining signal generator 250 supplies sustaining signals capable of maintaining each of the cells in one of their bistable states, as previously mentioned. Switching of selected cells between their stable states is provided by information coupled through suitable drive and switching networks 252 for actuating the selected cells in accordance with the information provided from the encoder 246. As an illustration, FIG. 25 shows a picture with contrasting brightness levels which may be obtained by writing into the cell array 248, in a line-by-line manner, and by either selecting the proper combination of cells in each cluster or by utilizing the duty cycle technique.

FIG. 26 illustrates a still further application of this invention utilizing an array 254 of individual cells having coupled thereto a sustaining signal generator 256 of the type previously mentioned. In this application, the array of individual cells 254 is utilized to store an image from a document 258 for eventual recording on a recording device 260.

A beam of light 262 sufficient to encompass the area of the document 258 is directed thereto. In the illustration of FIG. 26, it is arranged such that the document 258 is, for instance, a photographic negative wherein the image represents a clear area on the document so as to permit the light to be transmitted through the document in the image area, whereas light is otherwise blocked outside of the image area. As mentioned previously, if particles are produced in the cell by photoelectric emission, wall charges within the cell can be suitably formed so that the combination of the voltage due to the wall charges and the applied sustaining signal is sufficient to discharge the cell. Thus, by enabling the light beam 262 to penetrate only the image area on document 258, the beam passing through the document will then energize the corresponding individual cells in cell array 254. The image is, of course, thereafter retained on the array by means of the sustaining signal generator 256 so that the light beam can be removed.

The image can thereafter be conveniently transferred to a recorder 260 by any convenient means which can detect the difference between the cells containing the image information and the remaining cells on the array 254. Any photo-sensitive type device can be utilized which would detect and react to the light image from the cell containing the image information on the array 254 and provide corresponding output information.

A document having the information in the dark areas, with the remaining areas of the document relatively lighter, such as, for instance, in a typewritten sheet of material, will permit the light beam 262 to penetrate the general areas of the document 258 and thereby excite the corresponding cells in array 254. In this manner the darkened areas on the array 254 will represent the information contained in the darkened areas on the document 258. Suitable recording means 260 can be utilized to transfer the information now stored in the darkened areas in cell 254 to a more permanent form.

It is clear that an apparatus designed to provide only this copying function need not be connected to a computer. This gives rise to simplification of the array driving circuits in FIG. 26. No selection networks are required, and within each set of conductors on respective sides of the cell array all exciting electrodes can be connected together.

An alternative construction applicable for small displays of alpha-numeric characters can simplify the electrode arrangement. In this alternative embodiment, instead of using crossed grid electrodes, as has been previously illustrated, we can use, at each character position as shown in FIG. 27, a matrix of bar electrodes 280, only a few of which are shown, suitably placed so that by choosing appropriate bars, we can obtain the necessary characters. The matrix configuration on the front panel can be a set of bars 280 such that by choosing appropriate ones, we could construct any of the letters of the alphabet or any of the numbers—the required matrix configuration of electrodes being well known by those skilled in the art. On the back of the panel 282 we would simply have a series of solid electrode plates 284, each covering the respective character position defined by the corresponding set of bar electrodes on the front of the panel. The inner part of the display (panel 282) could be constructed the same as before, that is with many small holes, because it is not necessary to use individual electrodes to light each hole. In this application, a single bar 280 will light all of the holes under that bar simultaneously. It is, therefore, only necessary to provide the electronic means to select the appropriate bars. As an alternative, large holes specifically located under each electrode, or a cavity under each electrode can be provided. It is to be understood that instead of the individual back plates, one large conducting plate covering all of the character positions, or a similar set of bar electrodes on the back panel, may be utilized.

An interesting extension of this technique, which makes possible very fast addressing in a display, is to utilize the individual conducting back plates at each character position, for character position selection. A message is scanned to identify, for example, all of the A's in the message. Then, following this, all of the individual back plates that correspond to positions where there are to be A's are excited with, of course, the appropriate bars at all the character positions on the front of the panel that make up A's. The selection of locations where these characters are to appear is made by selecting the appropriate back plates. In a similar manner, the locations for other characters and other numbers are determined and written into the display in the same way. In this manner, an entire message including all the letters of the alphabet and all of the digits would be completed in 36 write cycles.

The foregoing description has been given for clearness of understanding only, and no unnecessary limitations should be understood therefrom, as modifications will be obivous to those skilled in the art.

What we claim is:

1. A pulsing gaseous discharge information minicell comprising:

a cell having inner end walls;

a pair of electrode means adjacent said end walls, including means for connection to a source of sustaining signals;

means, connectable to a power source for forming on respective end walls in said cell initial wall charges related to the entry of information, said means including a gaseous medium in the cell between said end walls; and means responsive to said sustaining signals for maintaining wall charges;

said means for maintaining wall charges including means causing said initial wall charges to cooperate with said sustaining signal to initiate a discharge of said gaseous medium to form subsequent wall charges of reversed polarity with respect to said initial wall charges on said respective end walls in said cell, enabling said discharge to be quenched soon after initiation thereof, said means for maintaining wall charges including means for causing said sustaining signals and said subsequent wall charges to cooperate to repetitively discharge said gaseous medium and maintain a wall charge condition in the cell wherein the presence or absence of said wall charge corresponds to said information.

2. A pulsing gaseous discharge information minicell as claimed in claim 1, wherein said means for forming initial wall charges in said cell includes a source of discharge signals coupled to said pair of electrode means, said discharge signals representing said information and initiating a discharge of said gaseous medium to form said initial wall charges on respective end walls in said cell and enabling said discharge to be quenched soon after initiation thereof.

3. A pulsing gaseous discharge information minicell as claimed in claim 1, wherein said means for forming initial wall charges in said cell comprises means for impinging radiation on said cell to produce photoelectric emission in said cell.

4. An information array comprising a plurality of pulsing gaseous discharge information minicells as claimed in claim 1, and wherein said pair of electrode means comprises a pair of opposed electrode assemblies.

5. Apparatus including an information array as claimed in claim 4, and wherein said means for forming initial wall charges includes selective addressing means coupled to said pair of opposed electrode assemblies for initiating a discharge of said gaseous medium to form said initial wall charges on respective end walls of corresponding selected cells in said array, thereby storing information in said array corresponding to the presence or absence of said wall charges in said selected cells.

6. An information array as claimed in claim 4, including means for producing visible light during said discharges of sufficient intensity for displaying said information.

7. An information array as claimed in claim 6, wherein said means for producing visible light comprises phosphorous material associated with said cells, said phosphorous material comprising means, responsive to radiant energy emitted during the discharges of the gaseous medium in the respective cells, for providing said visible light of a desired wavelength.

8. Apparatus as claimed in claim 5, said selective addressing means comprising means for providing at least two symmetrical drive signals (A and B) respectively applied to said pair of electrode assemblies to form corresponding initial wall charges of corresponding selected cells in the array representing respective information states (A and B), said cells in the array comprising means which, when in information state (A) respond only to drive signals (A) and not to drive signal (B), and which, when in information state (B) respond only to drive signal (B) and not to drive signal (A).

9. A pulsing gaseous discharge information minicell device comprising:

a cell having inner end walls;

a pair of electrode means adjacent said end walls;

means for forming on respective end walls in said cell initial wall charges related to the entry of information, said means including a gaseous medium in the cell between said end walls;

a source of discharge signals coupled to said pair of electrode means, said discharge signals representing said information for initiating a discharge of said gaseous medium to form said initial wall charges on respective end walls in said cell and enabling said discharge to be quenched soon after initiation thereof;

means coupled to said pair of opposed electrode means generating sustaining signals for maintaining wall charges, said sustaining signal cooperating with said initial wall charges to initiate a discharge of said gaseous medium to form subsequent wall charges of reversed polarity with respect to said initial wall charges on said respective end walls in said cell, enabling said discharge to be quenched soon after initiation thereof; and means responsive to said sustaining signals for maintaining wall charges, including means for causing said sustaining signals and said subsequent wall charges to cooperate to repetitively discharge said gaseous medium and maintain a wall charge condition in the cell wherein the presence or absence of said wall charge corresponds to said information.

10. A pulsing gaseous discharge information minicell device as claimed in claim 9, wherein said sustaining signal comprises generator means for generating an undulating waveform having a first portion cooperating with said initially formed wall charges to initiate a discharge and a second portion cooperating with said subsequently formed wall charges to initiate a subsequent discharge and thereby form another subsequent wall charge of reversed polarity with respect to said first mentioned subsequent wall charges on said respective end walls in said cell, said generating means comprises means for repetitively applying said sustaining signal to said pair of electrode means for maintaining said information in said cell.

11. A panel array for storing information, said panel array having a plurality of pulsing gaseous discharge cells, said panel array comprising:

a plurality of paired electrical conductors, each pair associated with a corresponding one of said cells, including means for connection to a source of sustaining signals;

insulating means between said paired conductors for electrically insulating the same and defining respective cell end walls;

means, connectable to a power source, for forming on respective end walls in said cells initial wall charges related to the entry of said information into the panel array, said means including a gaseous medium isolated within said insulating means, including respective portions thereof each associated with a pair of said electrical conductors and the corresponding cell; and means responsive to said sustaining signals for maintaining wall charges;

said means for maintaining wall charges including means causing said initial wall charges in respective cells to cooperate with said sustaining signals to initiate a corresponding discharge of said respective portions of the gaseous medium to form subsequent wall charges of reversed polarity with respect to said initial wall charges on said respective end walls in said corresponding cells enabling said discharge to be quenched soon after initiation thereof, said means for maintaining wall charges including means for causing said sustaining signals and said subsequent respective wall charges in said cells to cooperate to repetitively discharge said respective portions of the gaseous medium and maintain a wall charge condition in said corresponding cells wherein the presence or absence of said wall charge corresponds to said information.

12. Apparatus including a panel array as claimed in claim 11, and wherein said means for forming initial wall charges in said cells includes selective addressing means coupled to said plurality of paired electrical conductors for entering said information into corresponding selected cells in the panel array, said selective addressing means including a source of discharge signals for initiating a discharge of said respective portions of the gaseous medium to form said initial wall charges on respective end walls of corresponding selected cells in said array, thereby storing information in said panel array corresponding to the presence or absence of said wall charges in said selected cells.

13. A panel array as claimed in claim 11, including means for producing visible light during said discharges of sufficient intensity for displaying said information;

said means for producing visible light comprising phosphorous material including means, responsive to radiant energy emitted during the discharges of said respective portions of the gaseous medium of corresponding cells, for providing said visible light of a desired wavelength.

14. A panel array as claimed in claim 11, for multicolor display of said information, including means for associating respective cells with a selected phosphorous material to provide visible light of various respective desired wavelengths.

15. A panel array as claimed in claim 11, including means for producing visible light during said discharges of sufficient intensity for displaying said information; and means for varying the amount of light emitted during said discharges associated with each of said corresponding cells.

16. A panel array as claimed in claim 15, wherein said means for varying the amount of light emitted during said discharges comprises a plurality of four cell display positions including a screening element associated with each of said display positions, each of said display positions comprising:

a group of at least four of said cells, and said associated screening element having four areas of varying transparency, each area overlying a respective cell, so that the light emitted from each cell in the group varies in a binary manner.

17. Display apparatus including a panel array as claimed in claim 11, wherein said means for forming initial wall charges on respective end walls in said cells comprises means impinging radiation on said cells to produce photoelectric emission therein.

18. Display apparatus including a panel array as claimed in claim 11, wherein said means for forming initial wall charges on respective end walls in said cells comprises a high energy light source radiating through an image, so as to transfer said image to selected cells in said panel array.

19. A display apparatus as claimed in claim 18, including recording means for sensing and recording an image transferred to said panel array.

20. Memory apparatus for storing information in the form of word data bits, said apparatus having a plurality of bit positions, each including a panel array as claimed in claim 11, and wherein said means for forming initial wall charges in said cells includes selective addressing means coupled to said plurality of paired electrical conductors for initiating a discharge of said respective portions of the gaseous medium to form said initial wall charges on respective end walls of corresponding selected cells in said array, said selective address means including means for selecting corresponding cells in each of said arrays to transfer said data word into said memory apparatus.

21. Memory apparatus as claimed in claim 20, including read out means for transferring said stored information from said plurality of panel arrays.

22. Memory apparatus as claimed in claim 21, wherein said read out means includes interrogating means for interrogating the state of selected cells within said panel arrays, and light detecting means adapted to detect the state of said selected cells in cooperation with said interrogating means.

23. An information system including a panel array as claimed in claim 12, wherein said plurality of paired conductors is arranged in a row-and-column conductor configuration, each row-and-column conductor corresponding to a respective row and column of said cells, and each row of said cells comprising a line of information on said panel array, and wherein said selective addressing means comprises means for sequentially selecting said row conductors simultaneously with the selection of a plurality of column conductors intersecting said row conductors to initiate said discharge of the respective portion of the gaseous medium of corresponding cells at the intersection of said selected row and column conductors, thereby simultaneously writing information into said line and sequentially from line to line from one column end of the array to the other column end.

24. An information system for storing information in a plurality of pulsing gaseous discharge cells arranged in an array, said system comprising:

a plurality of paired electrical conductors, each pair associated with a corresponding one of said cells, insulating means between said paired conductors for electrically insulating the same and defining respective cell end walls;

a gaseous medium isolated within said insulating means, including respective portions thereof each associated with a pair of said electrical conductors and the corresponding cell;

selective addressing means coupled to said plurality of paired electrical conductors for entering said information into corresponding selected cells in the array, said selective addressing means including means for initiating a discharge at selected cells of said respective portions of the gaseous medium to form said initial wall charges on respective end walls of said corresponding selected cells in the array, thereby entering said information corresponding to the presence or absence of said wall charges in said selected cells;

a source of sustaining signals coupled to said plurality of paired electrical conductors for maintaining said information in the array, said sustaining signals cooperating with said initial wall charges in said selected cells to initiate a corresponding discharge of said respective portions of the gaseous medium to form subsequent wall charges of reversed polarity with respect to said initial wall charges on said respective end walls in said corresponding cells enabling said discharge to be quenched soon after initiation thereof; and means responsive to said sustaining signals for maintaining wall charges, including means for causing said sustaining signals and said subsequent respective wall charges in said cells to cooperate to repetitively discharge said respective portions of the gaseous medium and maintain a wall charge condition in said corresponding cells of the array.

25. An information system as claimed in claim 24, wherein said source of sustaining signals provides sustaining signals sufficient to discharge said respective portions of the gaseous medium of corresponding cells in said panel array without wall charges, but sufficient to repetitively discharge said respective portion of the gaseous medium of said corresponding selected cells in said panel array having said wall charges.

26. A display system including said system as claimed in claim 24, and further including means for producing visible light during said discharges of sufficient intensity for displaying said information.

27. A display system as claimed in claim 26, for direct display of digital information, wherein said selective addressing means comprises means for coupling said digital information directly to said array for addressing said selected cells and discharging the respective portion of the gaseous medium in accordance with said digital information.

28. A display panel having a plurality of character positions for displaying alpha-numeric characters, said panel comprising:

a non-conducting panel member defining opposing end walls at each of said character positions;

electrode means on one side of said panel member, adjacent said end walls;

a plurality of predetermined groups of electrode elements on the other side of said panel member adjacent said opposed end walls, each group located at a character position;

a gaseous medium isolated within said panel member, including respective portions thereof each associated with said electrode means and a corresponding one of said electrode elements;

selective addressing means for displaying a selected character at selected character positions, said selective addressing means coupled to said electrode means and said corresponding electrode element for initiating a discharge of said respective portion of the gaseous medium associated therewith to form initial wall charges on respective end walls in said panel member and enabling said discharge to be quenched soon after initiation thereof;

a source of sustaining signals coupled to said electrode means and said groups of electrode elements, said sustaining signals cooperating with respective initial wall charges to initiate a corresponding discharge of said respective portions of the gaseous medium to form subsequent wall charges of reversed polarity with respect to said initial wall charges on said respective end walls enabling said discharge to be quenched soon after initiation thereof; and means responsive to said sustaining signals for maintaining wall charges, including means for causing said sustaining signals and said subsequent respective wall charges in said cells to cooperate to repetitively discharge said respective portions of the gaseous medium and maintain a wall charge condition for selectively, contiuously displaying said selected characters.

29. The method of storing information in gaseous display cells comprising:

providing a gaseous, discharge-responsive medium between two wall surfaces;

forming an initial wall charge on said wall surfaces; and applying sustaining signals to said cells or cooperating with said initial wall charge to initiate a discharge of said gaseous medium to form a subsequent wall charge of reversed polarity with respect to said initial wall charge, enabling said discharge to be quenched soon after initiation thereof, said sustaining signals and subsequent wall charges cooperating to repetitively discharge said gaseous medium and selectively maintain a wall charge condition in the cell wherein the presence or absence of said wall charge corresponds to said information.

30. The method of claim 29, wherein said forming of an initial wall charge on said wall surfaces comprises the step of applying discharge signals to said cells for initiating a discharge of said gaseous medium and cooperating with said wall charge to enable said discharge to be quenched soon after initiation thereof.

31. The method of claim 29, wherein said forming of an initial wall charge on said wall surfaces comprises the step of impinging a radiation source on said cells sufficient to produce photoelectric emission therein.

32. The method of claim 29, wherein said applying of sustaining signals to said cells comprises the steps of applying an undulating waveform having a first portion cooperating with said initially formed wall charge to initiate a discharge, and thereafter applying a second portion cooperating with said subsequently formed wall charge to initiate a subsequent discharge and thereby form another subsequent wall charge, and repetitively applying said sustaining signals for maintaining said information in said cells.

33. The method of storing information in gaseous discharge cells as claimed in claim 29, including manipulating said wall charge in selected cells to control the transfer of information into and out of said cells.

References Cited

UNITED STATES PATENTS

| | | | |
|---|---|---|---|
| 854,104 | 5/1907 | Moore | 313—201X |
| 1,935,940 | 11/1933 | Case | 313—201X |
| 2,216,220 | 10/1940 | Baker | 313—201X |
| 2,268,870 | 1/1942 | Greenlee | 313—201X |
| 2,624,858 | 1/1953 | Greenlee | 313—201 |
| 2,629,839 | 2/1953 | Greenlee | 313—201 |
| 2,644,113 | 6/1953 | Etzkorn | 313—201 |
| 2,692,948 | 10/1954 | Lion | 313—201X |
| 2,847,615 | 8/1958 | Engelbart | 313—201X |
| 2,923,853 | 2/1960 | Engelbart | 313—201X |
| 2,943,223 | 6/1960 | Fay | 313—201 |
| 2,984,765 | 5/1961 | Engelbart | 313—201X |

TERRELL W. FEARS, Primary Examiner

U.S. Cl. X.R.

313—201

PO-1050
(5/69)

UNITED STATES PATENT OFFICE
CERTIFICATE OF CORRECTION

Patent No. 3,559,190 Dated March 5, 1971

Inventor(s) Donald L. Bitzer, et al.

It is certified that error appears in the above-identified patent and that said Letters Patent are hereby corrected as shown below:

Column 1, line 5, "University of Illinois" should be --University of Illinois Foundation--.

Column 2, line 59, "valume" should be --volume--.

Column 3, line 26, "to" should be --and--.

Column 3, line 64, "torr" should be --Torr--.

Column 3, line 68, "torr" should be --Torr--.

Column 4, line 66, "sinusodial" should be --sinusoidal--.

Column 4, line 69, "sinusodial" should be --sinusoidal--.

Column 5, line 33, "conductor" should be --conductors--.

Column 7, line 20, the formula "$0=\frac{Q}{C+1/2\ C_1}$" should be --$V_0=\frac{Q}{C+\ 1/2C_1}$--.

Column 11, line 53, "in" should be --is--.

Column 12, line 50, "are" should be --as--.

Column 15, line 43, "torr" should be --Torr--.

Column 18, line 38, "50" should be --500--.

Column 19, line 42, "qiuckly" should be --quickly--.

Column 22, line 48, "transistion" should be --transition--.

Column 22, line 54, "transistion" should be --transition--.

PO-1050
(5/69)

UNITED STATES PATENT OFFICE
CERTIFICATE OF CORRECTION

Patent No. 3,559,190 Dated March 5, 1971

Inventor(s) Donald L. Bitzer et al.

It is certified that error appears in the above-identified patent and that said Letters Patent are hereby corrected as shown below:

Column 23, line 49, "gass" should be --gas--.

Column 32, line 23, (Claim 25) "sufficient" should be --insufficient--.

Column 33, line 5, (Claim 28) "contuiously" should be --continuously--.

Column 33, line 13, (Claim 29), "or" should be --for--.

Signed and sealed this 6th day of July 1971.

(SEAL)
Attest:

EDWARD M.FLETCHER,JR.
Attesting Officer

WILLIAM E. SCHUYLER, JR.
Commissioner of Patents